US012797728B2

(12) United States Patent
Wang

(10) Patent No.: US 12,797,728 B2
(45) Date of Patent: Nov. 17, 2026

(54) RECOMMENDING VIRTUAL CHARACTER SELECTIONS AMONG TEAMMATES

(71) Applicant: Tencent Technology (Shenzhen) Company Limited, Shenzhen (CN)

(72) Inventor: Ziyi Wang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 236 days.

(21) Appl. No.: 18/402,097

(22) Filed: Jan. 2, 2024

(65) Prior Publication Data

US 2024/0131429 A1 Apr. 25, 2024

Related U.S. Application Data

(63) Continuation of application No. PCT/CN2022/134217, filed on Nov. 25, 2022.

(30) Foreign Application Priority Data

Feb. 25, 2022 (CN) ......................... 202210179852.6

(51) Int. Cl.
*A63F 13/533* (2014.01)
*A63F 13/42* (2014.01)
*A63F 13/795* (2014.01)

(52) U.S. Cl.
CPC ............ *A63F 13/533* (2014.09); *A63F 13/42* (2014.09); *A63F 13/795* (2014.09)

(58) Field of Classification Search
CPC ..................................................... A63F 13/795
See application file for complete search history.

(56) References Cited

U.S. PATENT DOCUMENTS

2007/0149289 A1* 6/2007 Nickell ................. A63F 13/795 463/42
2016/0001186 A1* 1/2016 Marr ................... G07F 17/3255 463/40

(Continued)

FOREIGN PATENT DOCUMENTS

CN 112891931 A 6/2021
CN 113617033 A 11/2021

(Continued)

OTHER PUBLICATIONS

Valve, New Pregame—Dota 2—7.00, Dec. 12, 2016, p. 3 (Year: 2016).*

(Continued)

*Primary Examiner* — Jay Huang
(74) *Attorney, Agent, or Firm* — ARENTFOX SCHIFF LLP

(57) ABSTRACT

A method includes displaying a first character selection interface of a first account of a multiplayer interactive service, the first character selection interface displaying one or more player accounts and a plurality of candidate virtual characters. The method further includes, in response to receiving in the first character selection interface a character recommendation operation including a selection of a first recommended virtual character and a selection of a second account, transmitting character recommendation information corresponding to the second account. The method further includes displaying, in the first character selection interface of the first account, an indication that the virtual character recommendation was applied to the second account.

20 Claims, 13 Drawing Sheets

(56) References Cited

U.S. PATENT DOCUMENTS

| | | | | |
|---|---|---|---|---|
| 2016/0005270 | A1* | 1/2016 | Marr | G07F 17/3255<br>463/25 |
| 2020/0398158 | A1* | 12/2020 | Morishita | A63F 13/5258 |
| 2021/0031106 | A1* | 2/2021 | Alderman | A63F 13/35 |
| 2021/0038996 | A1* | 2/2021 | Lin | A63F 13/795 |
| 2024/0029137 | A1* | 1/2024 | Zhang | A63F 13/87 |

FOREIGN PATENT DOCUMENTS

| | | | |
|---|---|---|---|
| CN | 113680066 | A | 11/2021 |
| JP | 2005-230168 | A | 9/2005 |
| JP | 2020-151498 | A | 9/2020 |

OTHER PUBLICATIONS

International Search Report issued in International Application No. PCT/CN2022/134217, mailed Feb. 20, 2023, with English Translation, 6 pages.

"Overwatch: a FPS * Today's sale which is different from COD", YouTube, Available on internet at: <https://www.youtube.com/watch?v=Sr5EvG5qR_M><2025>, 2016, pp. 2-3 (Original Document only).

Office Action received for Japanese Patent Application No. 2024-531537, mailed on Feb. 25, 2025, 17 pages (8 pages of English Translation and 9 pages of Original Document).

"Candy Superhero, Game Entry Interface chooses hero, has that taste", Game World for Machine No. 2, Available online at: <https://www.bilibili.com/video/BV1ub4y1U7vr/?%20Spm_id_from=333.%20337.%20Search-card.all.click>, Sep. 3, 2021, 3 pages (Original copy only).

Office Action received for Chinese Patent Application No. 202210179852.6, mailed on Dec. 18, 2025, 22 pages (9 pages of English Translation and 13 pages of Original Document).

"[Global e-Game] Metal Revolution, a mobile fighting game that challenges global matchmaking", GameVU, Available online at: <https://www.gamevu.co.kr/news/articleView.html?idxno=21182>, 2021, 3 pages (Official copy only).

Office Action received for Korean Patent Application No. 10-2024-7009745, mailed on Aug. 12, 2025, 17 pages (9 pages of English Translation and 8 pages of Original Document).

* cited by examiner

RECOMMENDING VIRTUAL CHARACTER SELECTIONS AMONG TEAMMATES

RELATED APPLICATIONS

This application is a continuation of International Application No. PCT/CN2022/134217, filed on Nov. 25, 2022, which claims priority to Chinese Patent Application No. 202210179852.6, entitled "METHOD AND APPARATUS FOR RECOMMENDING VIRTUAL CHARACTER, DEVICE, STORAGE MEDIUM, AND PROGRAM PRODUCT" and filed on Feb. 25, 2022. The disclosures of the prior applications are hereby incorporated by reference in their entirety.

FIELD OF THE TECHNOLOGY

Embodiments of this application relate to the field of internet technologies, including a method and an apparatus for processing a virtual character, a device, a storage medium, and a program product.

BACKGROUND OF THE DISCLOSURE

In some multiplayer interactive virtual scenarios, for example, a multiplayer online battle arena (MOBA) service, each user participates in interaction through a selected virtual character. After the user is familiar with virtual characters in the virtual scenarios, to select a virtual character, the user may select a corresponding virtual character from a list of all virtual characters according to a virtual character selected by a teammate. Alternatively, after selecting a virtual character, the user may recommend a virtual character to another user through typing or voice to organize a lineup.

SUMMARY

Embodiments of this disclosure provide a method and an apparatus for processing a virtual character, a device, a storage medium, and a program product. The technical solutions are as follows.

In an embodiment, a method for processing a virtual character includes displaying a first character selection interface of a first account of a multiplayer interactive service, the first character selection interface displaying one or more player accounts and a plurality of candidate virtual characters. The one or more player accounts participate in the multiplayer interactive service through respective virtual characters. The method further includes, in response to receiving in the first character selection interface a character recommendation operation including a selection of a first recommended virtual character from the plurality of candidate virtual characters and a selection of a second account from the one or more player accounts, transmitting character recommendation information corresponding to the second account. The character recommendation information indicates a virtual character recommendation for the second account. The method further includes displaying, in the first character selection interface of the first account, an indication that the virtual character recommendation was applied to the second account.

In an embodiment, an apparatus for processing a virtual character includes processing circuitry configured to display a first character selection interface of a first account of a multiplayer interactive service, the first character selection interface displaying one or more player accounts and a plurality of candidate virtual characters. The one or more player accounts participate in the multiplayer interactive service through respective virtual characters. The processing circuitry is further configured to, in response to receiving in the first character selection interface a character recommendation operation including a selection of a first recommended virtual character from the plurality of candidate virtual characters and a selection of a second account from the one or more player accounts, transmit character recommendation information corresponding to the second account. The character recommendation information indicates a virtual character recommendation for the second account. The processing circuitry is further configured to display, in the first character selection interface of the first account, an indication that the first recommended virtual character was applied to the second account.

In an embodiment, a non-transitory computer-readable storage medium stores computer-readable instructions thereon, which, when executed by processing circuitry of a terminal device, cause the terminal device to perform a method including displaying a first character selection interface of a first account of a multiplayer interactive service, the first character selection interface displaying one or more player accounts and a plurality of candidate virtual characters. The one or more player accounts participate in the multiplayer interactive service through respective virtual characters. The method further includes, in response to receiving in the first character selection interface a character recommendation operation including a selection of a first recommended virtual character from the plurality of candidate virtual characters and a selection of a second account from the one or more player accounts, transmitting character recommendation information corresponding to the second account. The character recommendation information indicates a virtual character recommendation for the second account. The method further includes displaying, in the first character selection interface of the first account, an indication that the virtual character recommendation was applied to the second account.

DESCRIPTION OF EMBODIMENTS

To make objectives, technical solutions, and advantages of this disclosure clearer, implementations of this disclosure are further described below in detail with reference to the accompanying drawings.

In this specification, steps performed by all accounts may be considered as steps performed by a user of an account through a terminal device.

In a multiplayer interactive virtual scenario, after selecting a virtual character, a user may recommend a virtual character to another user through typing or voice to organize a lineup. However, in a manner of recommending a virtual character to another user through typing or voice, it takes a long time for the user to perform typing or voice input, resulting in low efficiency of information recommendation. In addition, a recommended user (i.e., a user to whom a recommendation is made) needs to manually select a corresponding recommended virtual character from a large number of virtual characters, also resulting in low efficiency of selecting a virtual character.

Figure 1:
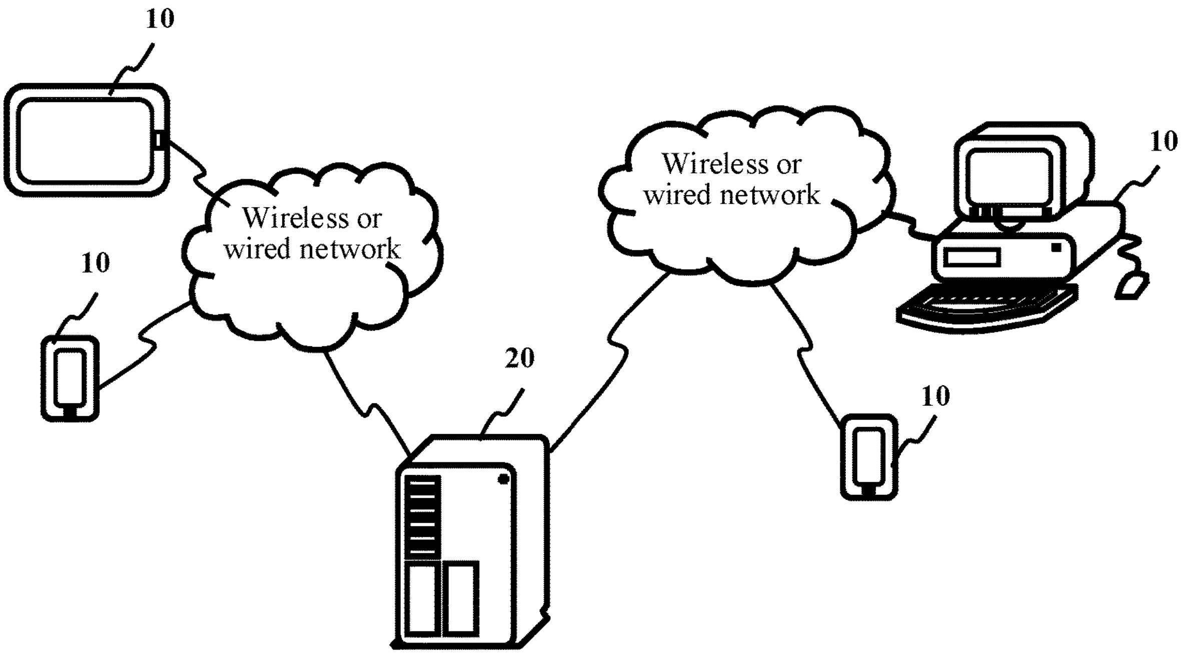
FIG. 1 is a schematic diagram of an implementation environment of a solution according to some embodiments of this disclosure.

Therefore, embodiments of this disclosure provide a method for processing a virtual character. FIG. 1 is a schematic diagram of an implementation environment of a solution according to some embodiments of this disclosure. The implementation environment of the solution may be implemented as a system for processing a virtual character and may recommend a virtual character to another user. The implementation environment of this solution may include: a terminal device 10 and a server 20.

The terminal device 10 may be an electronic device such as a mobile phone, a tablet computer, a personal computer (PC), a wearable device, an in-vehicle terminal device, a virtual reality (VR) device, and an augmented reality (AR) device, or the like. This is not limited in this disclosure. A client running an application may be installed on the terminal device 10.

In the embodiments of this disclosure, the foregoing application is any application that can perform a multiplayer interactive service. For example, the application may be a MOBA game, a third-person shooter (TPS) game, a first-person shooter (FPS) game, a VR shooting application, an AR application, a social application, an interactive entertainment application, or the like. In addition, virtual characters provided in different applications have different forms and corresponding functions, which may be preset according to an actual requirement. This is not limited in the embodiments of this disclosure. Certainly, in an exemplary embodiment, the same application may further provide a user with a plurality of virtual characters with different functions. This is not limited in the embodiments of this disclosure.

The foregoing virtual character is a virtual character controlled by a user account in an application. For example, the application is a game application. The virtual character is a game character controlled by the user account in the game application. The virtual character may be in a human form, an animal form, a cartoon form, or another form. This is not limited in the embodiments of this disclosure. The virtual character may be displayed in a three-dimensional form or a two-dimensional form. This is not limited in the embodiments of this disclosure.

In a possible implementation, the foregoing virtual characters include virtual characters on the same side and virtual characters on different sides, that is, in the application, the virtual characters are divided into different sides (or referred to as user groups). A MOBA game is used as an example. 10 users are divided into a red team and a blue team to play a game, every five people forming one team. In this case, the five virtual characters in the red team are on the same side and are teammates, the five virtual characters in the blue team are on the same side and are teammates, and the virtual characters in the red team and the virtual characters in the blue team are on different sides and are in a hostile enemies.

The server 20 may be an independent physical server, or may be a server cluster or a distributed system formed by a plurality of physical servers, or may be a cloud server that provides a cloud computing service. The server 20 may be a backend server of the foregoing application, and is configured to provide a backend service to clients of the application, for example, implementing transmission and receiving of recommendation information between the clients, and implementing data synchronization in the clients.

In some embodiments, the foregoing application may be an independent application (APP) developed separately, or may be a mini program, or another form of application such as a web application. This is not limited in this disclosure.

The terminal device 10 and the server 20 may communicate with each other through a network.

In some embodiments, a recommender recommends a virtual character to a recommendee through an operation in a character selection interface. A terminal device used by the recommender is a first terminal, and a device used by the recommendee is a second terminal. A client of an application installed on the first terminal is referred to as a first client, and a first account is an account for logging in to the first client. A client of an application installed on the second terminal is referred to as a second client, and a second account is an account for logging in to the second client. The first account may transmit character recommendation information to the second client through the first client to recommend a virtual character, and help a user of the second account to choose a virtual character suitable for a team, thereby improving efficiency of human-computer interaction and reducing operations required for the second terminal to select a suitable virtual character. In some embodiments, the second account may further transmit the character recommendation information to the first account through the second client to recommend a virtual character. In some embodiments, any account may transmit the character recommendation information to another account through a client to recommend a virtual character. This is not limited in this disclosure.

Figure 2:
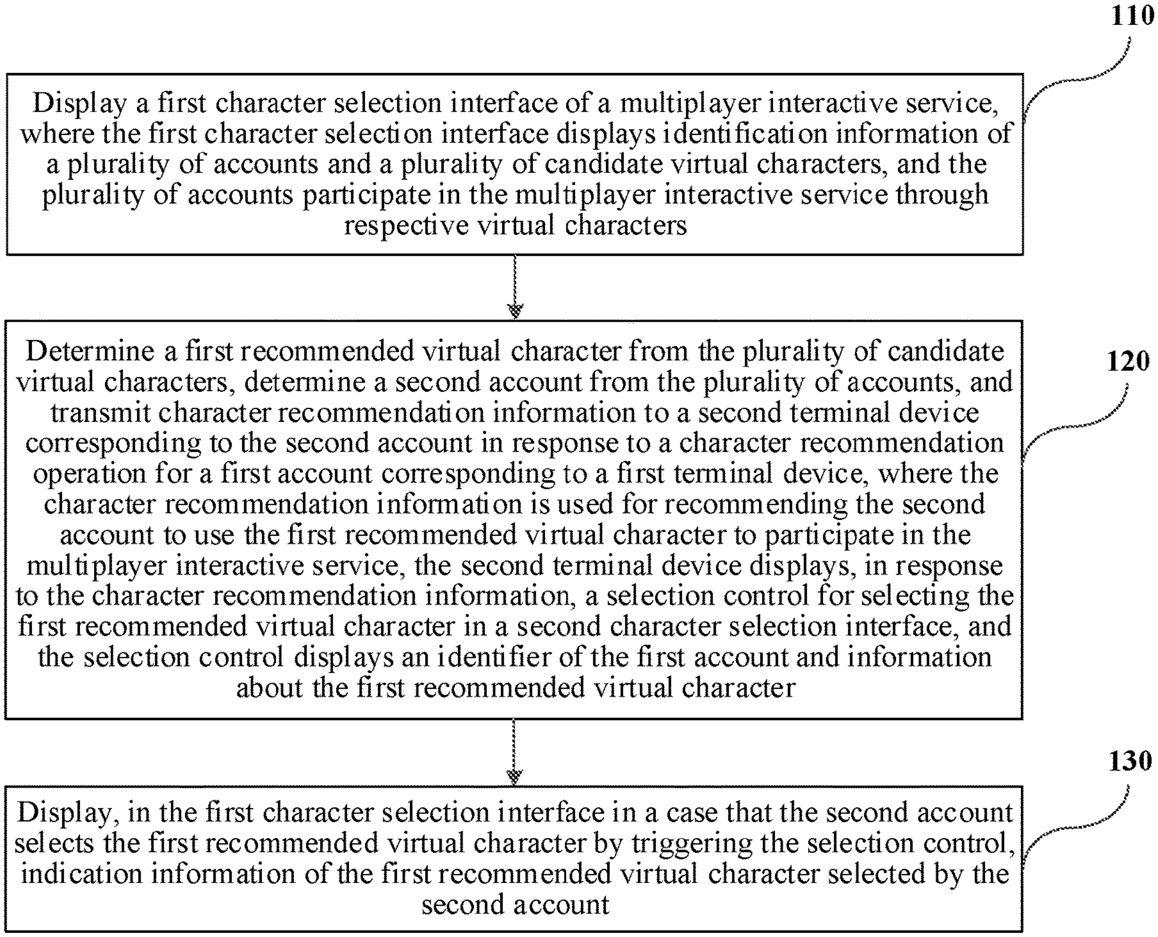
FIG. 2 is a flowchart of a method for processing a virtual character according to some embodiments of this disclosure.

FIG. 2 is a flowchart of a method for processing a virtual character according to some embodiments of this disclosure. An execution body of the method may be the terminal device 10 in the implementation environment shown in FIG. 1. For example, the steps may be performed by a first terminal device, and the first client of the application is installed on the first terminal device. The method may include at least one step in the following steps (110 to 130):

Step 110: Display a first character selection interface of a multiplayer interactive service, where the first character selection interface displays identification information of a plurality of accounts (teammate accounts) and a plurality of candidate virtual characters, and the plurality of accounts participate in the multiplayer interactive service through respective virtual characters. For example, a first character selection interface of a first account of a multiplayer interactive service is displayed. The first character selection interface displays one or more player accounts and a plurality of candidate virtual characters. The one or more player accounts participate in the multiplayer interactive service through respective virtual characters.

The multiplayer interactive service refers to that a plurality of users participate in interactions through virtual characters. For example, the multiplayer interactive service may be a multiplayer arena game. The arena game refers to a battle situation in which virtual characters on different sides compete with each other. The arena game includes virtual characters on at least two sides, and there may be the same quantity or different quantities of virtual characters on different sides. Certainly, in an exemplary embodiment, virtual characters included on different sides in the same arena game may have the same or different functions. The multiplayer arena game is a mode in which the plurality of users compete in a game in real time, and a plurality of accounts compete using respective virtual characters selected by the accounts.

In some embodiments, before the interactive service is started, users participating in the interactive service select virtual characters according to an actual case, and the virtual characters are virtual characters controlled by the users in the interactive service. One user may control one or more virtual characters in the interactive service. This is not limited in the embodiments of this disclosure. That is, before starting the interactive service, the user may select one or more virtual characters, and quantities of virtual characters selected by different users may be the same or different. This is not limited in the embodiments of this disclosure. In some embodiments, in a case that a user selects a plurality of virtual characters, the user may use an account to select a plurality of virtual characters. Alternatively, a user may use a plurality of accounts to select a plurality of virtual characters, and different virtual characters correspond to different accounts.

The character selection interface is an interface for the user to select a virtual character to be used by the user. The character selection interface displays identification information of the plurality of accounts participating in the multiplayer interactive service and information about a plurality of virtual characters to be selected. The identification information of each account includes, but is not limited to, at least one of the following: an avatar, an account nickname, and an account identity document (ID). The account nickname is a name given by the user to an account of the user, and is a name that is decided by the user and can be subsequently changed. The account ID is an ID generated by a server when the user creates an account, and the ID generally includes numbers and letters. The account ID is an ID used by the server to identify the account, and the account nickname is another ID used by the user to identify the account. The virtual character is a virtual character that is used by each account in a plurality of interactive services and is used in a game. The account enters the multiplayer interactive service by selecting the virtual character in the character selection interface, and uses the selected virtual character to battle other accounts in the multiplayer interactive service.

Figure 3A:
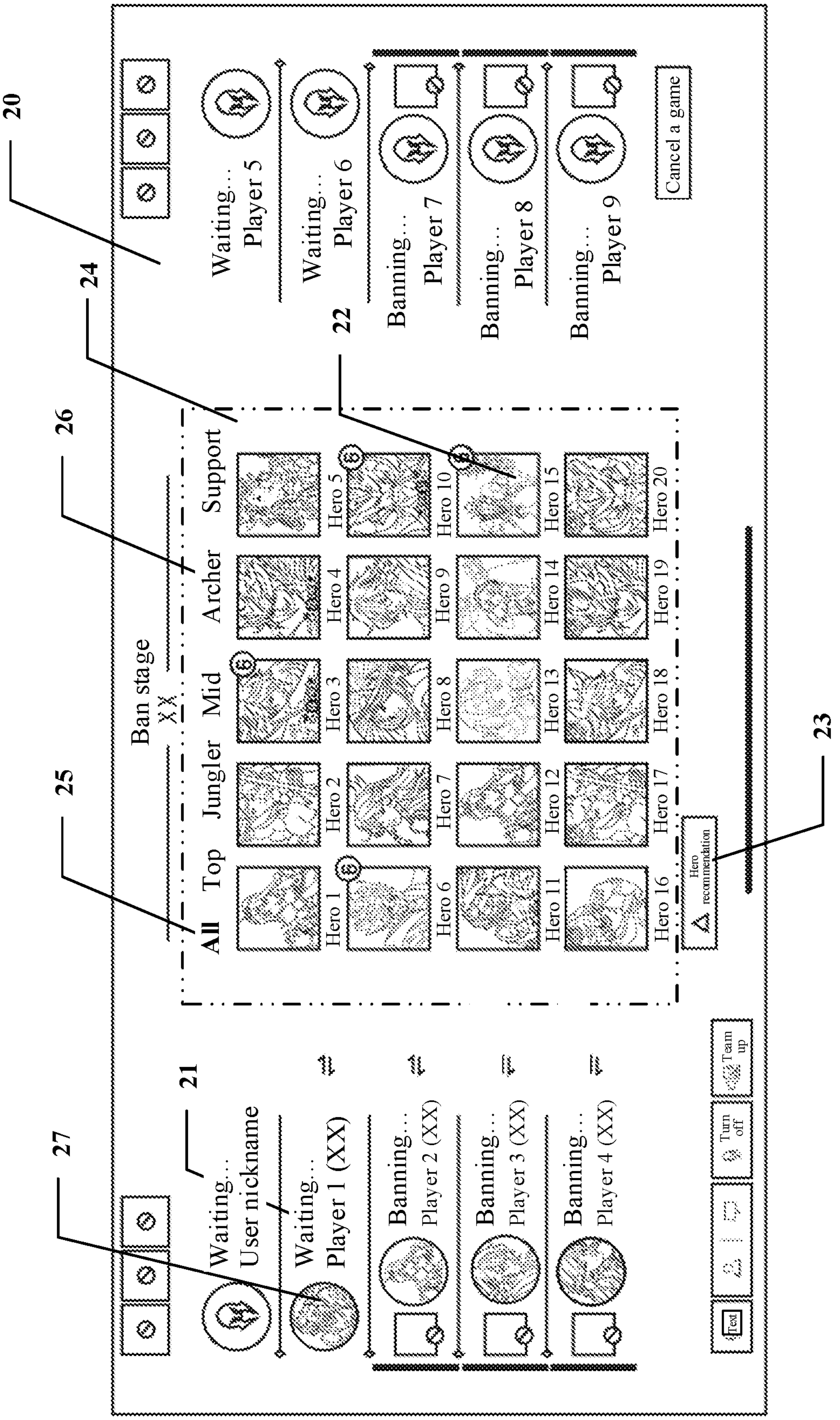
FIG. 3A and FIG. 3B are schematic diagrams of a character selection interface according to some embodiments of this disclosure.

In some embodiments, FIG. 3A shows an example of a schematic diagram of a character selection interface. A character selection interface 20 displays identification information 21 of an account, information 22 about a virtual character, and a character recommendation control 23.

Step 120: Determine a first recommended virtual character from the plurality of candidate virtual characters, determine a second account from the plurality of accounts, and transmit character recommendation information to a second terminal device corresponding to the second account in response to a character recommendation operation for a first account corresponding to the first terminal device in the first character selection interface, where the character recommendation information is used for recommending the second account to use the first recommended virtual character to participate in the multiplayer interactive service, the second terminal device displays, in response to the character recommendation information, a selection control for selecting the first recommended virtual character in a second character selection interface, and the selection control displays an identifier of the first account and information about the first recommended virtual character. For example, character recommendation information is transmitted in response to receiving in the first character selection interface a character recommendation operation including a selection of a first recommended virtual character from the plurality of candidate virtual characters and a selection of a second account from the one or more player accounts. The character recommendation information indicates a virtual character recommendation for the second account.

The second account is an account of a recommendee user, and the second terminal device is a terminal device corresponding to the second account, for example, a terminal device to which the second account is logged in. Similarly, the first account is an account of a recommender user, and a terminal device corresponding to the first account is the first terminal device, for example, a terminal device to which the first account is logged in. The first recommended virtual character is a virtual character recommended by the first account to the second account, and is used for recommending the second account to select the virtual character. The second account may use or not use the first recommended virtual character according to preferences and requirements of the second account. In some embodiments, there may be one or more first recommended virtual characters. This is not limited in this disclosure.

Candidate virtual characters are virtual characters for selection by the first account when the first account recommends a virtual character. In some embodiments, the candidate virtual characters may be all virtual characters, or may be some virtual characters after classification by character types. For example, as shown in FIG. 3A, a plurality of candidate virtual characters are displayed in a candidate virtual character region 24 in FIG. 3A, and the first account may select a candidate virtual character in an "All" option 25. In this case, the candidate virtual characters may be all virtual characters. The first account may alternatively select a candidate virtual character by selecting an "Archer" option 26. In this case, the candidate virtual characters are archer-type virtual characters.

The character recommendation information is used for indicating the first account to recommend the second account to use a first virtual character to participate in the multiplayer interactive service. According to the character recommendation operation for the first account in the first terminal device, the first terminal device generates corresponding character recommendation information and transmits the character recommendation information to a server, and the server transmits the character recommendation information to the second terminal device. The character recommendation information includes at least the following content: an account ID of the first account (a recommender party), an account ID of the second account (a recommendee party), an ID of the first client, an ID of the second client, and information about a recommended virtual character.

In some embodiments, the first account recommends the first virtual character to the second account according to a lineup, and the first terminal device generates the character recommendation information according to a recommendation operation of the first account. Next, the first terminal device transmits the generated character recommendation information to the server, and the server transmits the character recommendation information to the second terminal device according to the ID of the second client in the character recommendation information. Finally, the character recommendation information is displayed in the second character selection interface of the second terminal device.

Step 130: Display, in the first character selection interface in a case that the second account selects the first recommended virtual character by triggering the selection control, indication information of the first recommended virtual character selected by the second account. For example, an indication that the first recommended virtual character was applied to the second account is displayed in the first character selection interface of the first account.

The indication information of the first recommended virtual character selected by the second account is used for indicating that the second account has selected the first recommended virtual character, and the first recommended virtual character selected by the second account is displayed in the first terminal device and the second terminal device. In some embodiments, in a character display region of the second account, in addition to displaying the indication information of the first recommended virtual character selected by the second account, an avatar of the first recommended virtual character is further displayed. In some embodiments, as shown in FIG. 3A, a player 1 in FIG. 3A may be considered as the second account, and an avatar 27 of a virtual character selected by the player 1 is displayed in FIG. 3A. The avatar of the virtual character 27*s* displayed, so that it is determined that the virtual character selected by the player 1 is the virtual character 27.

In the embodiments of this disclosure, a recommender selects a recommended virtual character in a character selection interface and transmits character recommendation information with a terminal device to provide the recommended virtual character to a recommendee. After receiving the character recommendation information, a terminal device of the recommendee displays a shortcut selection control for the recommended virtual character in the character selection interface, so that the recommendee quickly selects the virtual character. The recommender selects the recommended virtual character in the character selection interface to recommend the virtual character to the recommendee. Compared with systems in which a character can only be recommended through typing or voice in related technologies, the method for processing a virtual character in this disclosure is more efficient, reduces the time for the recommender to provide character recommendation information, reduces operations required for the terminal device of the recommendee to select an appropriate virtual character, and improves the efficiency of human-computer interaction.

In some embodiments, a method for selecting the first recommended virtual character and the second account by the first account may be implemented in a plurality of manners as follows (three implementation A, B, and C):

Method A: In response to a selection operation for any virtual character in the plurality of candidate virtual characters, the selected virtual character is determined as the first recommended virtual character, and an account selection control displayed in the character selection interface is switched from an un-triggerable (or un-triggered) state to a triggerable (or triggered) state.

At least one candidate account (candidate teammate account) in the plurality of accounts (teammate accounts) is displayed in response to a trigger operation on the account selection control. In some embodiments, the at least one candidate account is an account that satisfies a first condition and is selected from the plurality of accounts, where the first condition includes at least one of the following: an account has not selected a virtual character, or recommendation to use a virtual character is allowed for an account;

in response to a selection operation for any account in the at least one candidate account, the selected account as the second account, to transmit the character recommendation information to the second terminal device.

Figure 3B:
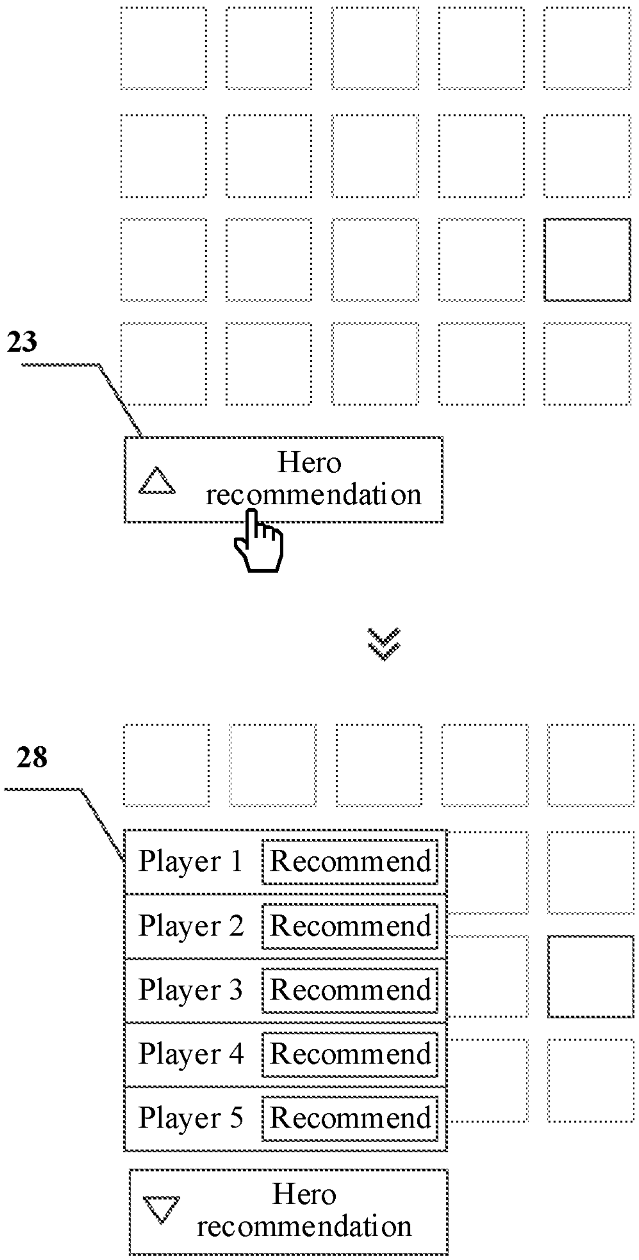

In the method A, after a user determines the selected first virtual character through a selection operation for the first virtual character, the selected recommended character is displayed in a recommended character display region. For example, as shown in FIG. 3B, after the user selects the first virtual character, an account selection control 23 is switched from an un-triggerable state to a triggerable state. Through a triggering operation on the account selection control 23 in a triggerable state, a candidate account list 28 that satisfies the first condition is displayed. After a user of the first account chooses the second account in the candidate account list 28, character recommendation information corresponding to the foregoing first virtual character is transmitted to the second terminal device through the server.

In some embodiments, the first condition may be that the candidate account has not selected a virtual character. When the candidate account has not selected a virtual character, it means that the candidate account has not locked a virtual character. When the candidate account preselects a virtual character, the virtual character is in an unlocked state. The preselecting a virtual character represents the candidate account intends to select the virtual character, and locking represents that the virtual character finally chooses one virtual character. The user may preselect a plurality of virtual characters, and then lock one virtual character in the preselected virtual characters. In some embodiments, the first condition may be that recommendation to use a virtual character is allowed for the candidate account. Before an account joins the multiplayer interactive service, it may be set whether to allow recommendation to use a virtual character for the account. When it is set to allow recommendation to use a virtual character for the account, the account does not become the candidate account. In some embodiments, the first condition may be a combination of the foregoing two conditions. An account that has not selected a virtual character and for which recommendation to use a virtual character is allowed can become a candidate account.

Figure 4:
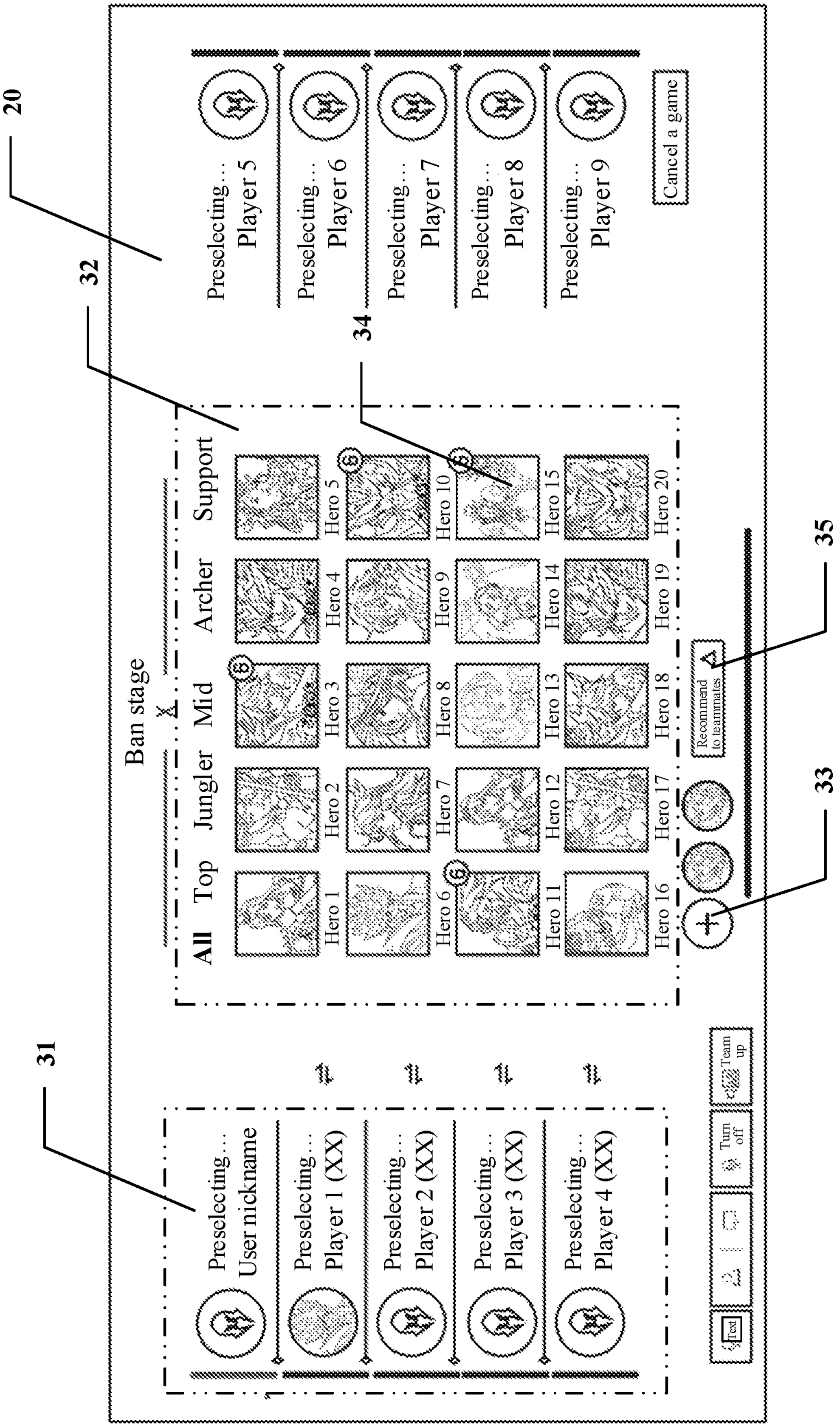
FIG. 4 is a schematic diagram of selecting a character and an account according to some embodiments of this disclosure.

In some embodiments, FIG. 4 shows an example of a schematic diagram of a method for processing a virtual character. In a character selection interface 20 in FIG. 4, a candidate account region 31 and a candidate virtual character region 32 are displayed. A first virtual character 34 is selected from the candidate virtual character region 32 by tapping a virtual character selection control 33. In this case, after the first virtual character 34 is selected, an account selection control 35 is switched from an un-triggerable state to a triggerable state. In this case, an account selection list is displayed by tapping the account selection control 35 in a triggerable state. After the user of the first account selects any account in the account selection list, character recommendation information is transmitted to a terminal device of the selected account. In some embodiments, there may be a plurality of virtual character selection controls 33 to select a plurality of first virtual characters, and character recommendation information is transmitted to a terminal device of the selected account. The character recommendation information includes information about the plurality of first virtual characters.

Through the method A, a virtual character is recommended by selecting a recommended virtual character first and then selecting a recommendee account. The method A may select a plurality of recommended virtual characters for recommendation. Compared with a manner of recommending a single character in a method B and a method C, the method A reduces operations required for the recommender to recommend a plurality of virtual characters at the same time, and also improves the efficiency of human-computer interaction.

Method B: In response to a gesture swipe operation from a display region of any virtual character to a display region of any account, according to a start position and an end position that correspond to the gesture swipe operation, a virtual character corresponding to the start position is determined as the first recommended virtual character, and an account corresponding to the end position is determined as the second account, to transmit character recommendation information to the second terminal device.

A selectable account and an unselectable account in the plurality of accounts are displayed differently in the first character selection interface during execution of the gesture swipe operation.

The second account and another account in the plurality of accounts are displayed differently in response to the end position of the gesture swipe operation being located within a display region of the second account.

In the method B, the first recommended virtual character is selected through tapping or long pressing, and then the recommendee account is selected by swiping a finger. In some embodiments, a selectable account and an unselectable account in the plurality of accounts are displayed differently. In some embodiments, the selectable account is an account that satisfies the first condition, and the selectable account is displayed in a gray box. The unselectable account is an account that does not satisfy the first condition, and the unselectable account is not displayed in any way. In addition, when the first recommended virtual character is moved to a selectable account by swiping a finger, the selectable account is displayed emphatically, for example, a recommended selectable account is displayed in a yellow box.

Figure 5:
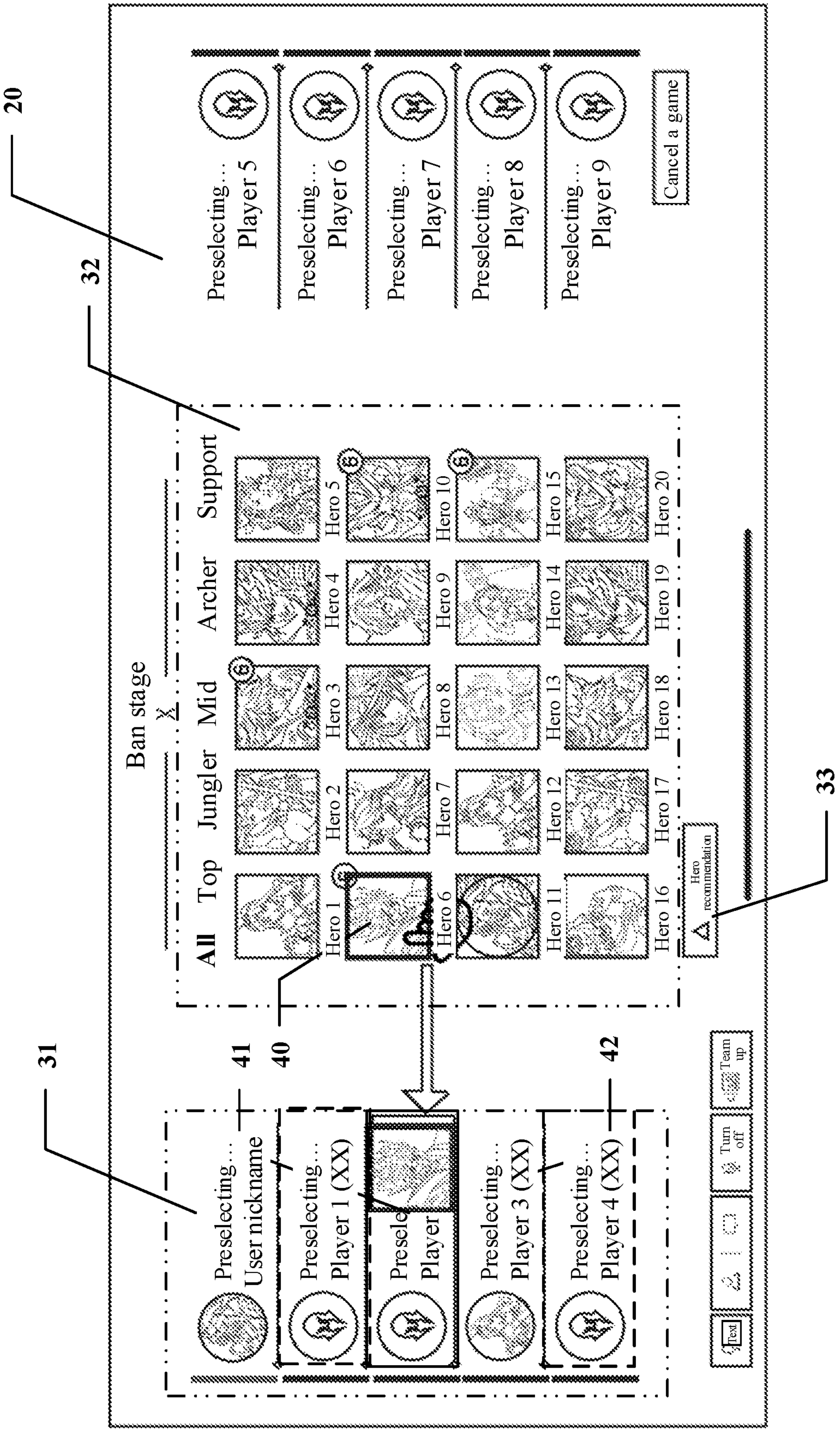
FIG. 5 is a schematic diagram of selecting a character and an account according to some other embodiments of this disclosure.

In some embodiments, FIG. 5 shows an example of a schematic diagram of another method for processing a virtual character. In a character selection interface 20 in FIG. 5, a candidate account region 31 and a candidate virtual character region 32 are displayed, and a first virtual character 40 in the candidate virtual character region 32 is chosen through tapping or long pressing. In this case, a selectable account and an unselectable account in the candidate account region 31 are displayed differently. A selectable account 41 is highlighted with a dashed box, and an unselectable account 42 is not highlighted. When a user moves the first virtual character 40 to the selectable account 41 by moving a finger, the dashed box of the selectable account 41 changes to a solid box, indicating that the selectable account 41 is a recommendee account. After the user releases the finger, it is determined that the first virtual character 40 is recommended to the selectable account 41, and a terminal device of the user transmits character recommendation information corresponding to the first virtual character 40 to a terminal device corresponding to the selectable account 41 through the server.

In the method B, the recommended virtual character is chosen through tapping or long pressing, and then the recommended virtual character is recommended to a recommendee account by swiping a finger. Compared with the method A and the method C, in a case that one recommended virtual character needs to be recommended, operations are simple, and operations required for recommending a virtual character are reduced, thereby improving the efficiency of human-computer interaction.

Method C: The selected virtual character is determined as the first recommended virtual character in response to a selection operation for any virtual character in the first character selection interface, and at least one candidate account is displayed in the plurality of accounts around an operation position of the selection operation.

In response to a swipe operation from the operation position of the selection operation to a display region of any account in at least one candidate account displayed around, an account corresponding to an end position of the swipe operation is determined as the second account, to transmit the character recommendation information to the second terminal device.

The first terminal device displays a roulette or list in the first character selection interface in response to a long press operation of a user on the first recommended virtual character. The user recommends the first recommended virtual character to the second account by moving a finger to a position of the second account in the roulette or the list, and transmits character recommendation information corresponding to the first recommended virtual character to the second terminal device through the server. In some embodiments, candidate accounts in the foregoing roulette or list are displayed in the same manner as in the method B. A manner of displaying candidate accounts in the roulette or list is not limited in this disclosure.

In the method C, a virtual character is recommended through long pressing, accounts are displayed in a roulette or list, and a recommendee account is selected to recommend a virtual character. Compared with the method B, the method C is more accurate in selecting a recommendee account than the method B. On the basis of improving the efficiency of human-computer interaction, a mistouch on a candidate account is further avoided, and an accuracy rate of selecting a virtual character or a recommendee account by a recommender is increased.

Through three different operation methods for recommending a virtual character, the diversity of recommending a virtual characters is increased. In addition, the method for a user to select and set a recommended virtual character for use improves the efficiency of recommending a character.

Figure 6:
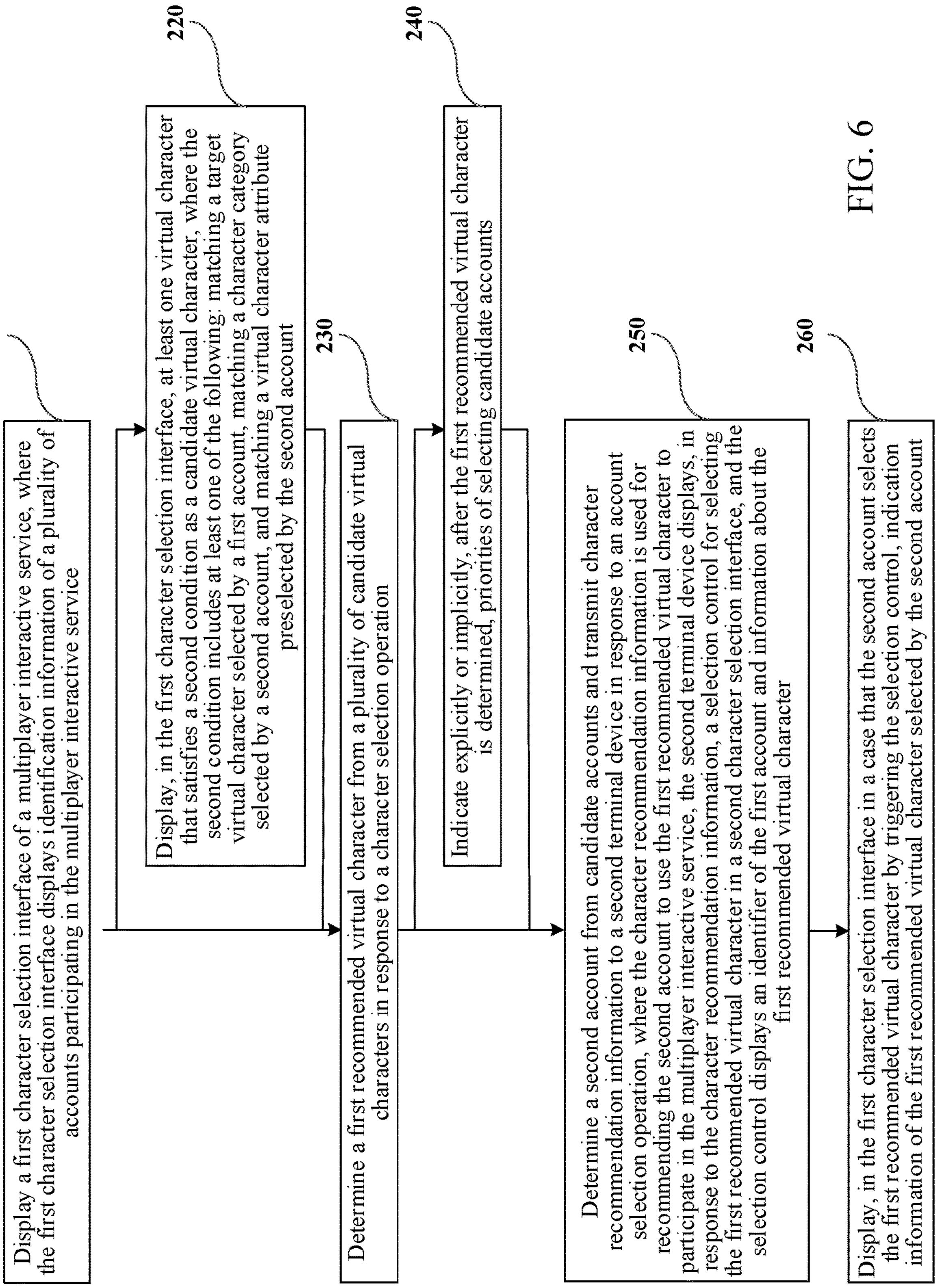
FIG. 6 is a flowchart of a method for processing a virtual character according to some other embodiments of this disclosure.

FIG. 6 is a flowchart of a method for processing a virtual character according to some other embodiments of this disclosure. An execution body of the method may be the terminal device 10 in the implementation environment shown in FIG. 1. For example, the steps may be performed by the first terminal device, and the first client of the target application is installed on the first terminal device. The method may include at least one step in the following steps (210 to 260):

Step 210: Display a first character selection interface of a multiplayer interactive service, where the first character selection interface displays identification information of a plurality of accounts participating in the multiplayer interactive service.

Step 220: Display, in the first character selection interface, at least one virtual character that satisfies a second condition as a candidate virtual character, where the second condition includes at least one of the following: matching a target virtual character selected by a first account, matching a character category selected by a second account, and matching a virtual character attribute preselected by the second account.

In some embodiments, the candidate virtual character may be some virtual characters obtained through selection from all the virtual characters. For example, the candidate virtual character is a virtual character that matches the target virtual character selected by the first account. For example, when the target virtual character selected by the first account is an archer, in this case, the terminal device obtains, from another external information medium or through internal data analysis according to an archer virtual character selected by the first character, a support virtual character matching the archer virtual character, and displays the support virtual character in the terminal device. The first account may recommend the obtained support virtual character to an account that tends to be a support.

In some embodiments, the candidate virtual character may be a virtual character matching a character type selected by the second account. Before selecting virtual characters, accounts may preselect virtual character tendencies of the accounts, for example, character types such as a physical damage character, a magical damage character, a tank character. The first account recommends, according to the character type selected by the second account, a virtual character corresponding to the character type to the second account The virtual character corresponding to the character type selected by the second account is displayed in the character selection interface.

In some embodiments, the candidate virtual character may be a virtual character matching the virtual character attribute preselected by the second account. For example, the virtual character attribute may be an interactive position of the virtual character in a virtual scenario. The accounts may select respective virtual character attributes before joining the multiplayer interactive service. For example, before joining the multiplayer interactive service, the second account selects an attribute 1 as the virtual character attribute, and a virtual character corresponding to the attribute 1 selected by the second account is displayed in the character selection interface.

Candidate virtual characters are selected according to the plurality of conditions to obtain the selected virtual characters, which reduces the time required for a user to find a recommended character from the candidate characters. Through selection of virtual characters, a quantity of candidate characters is reduced, thereby improving efficiency of human-computer interaction for the user to find a recommended character from candidate characters.

In some embodiments, in response to a character recommendation operation for the first account, the first recommended virtual character is determined from a plurality of candidate virtual characters.

The character recommendation operation includes a character selection operation and an account selection operation. The character selection operation is an operation of selecting a recommended virtual character, and the account selection operation is an operation of selecting a recommendee from candidate accounts.

Step 230: Determine a first recommended virtual character from a plurality of candidate virtual characters in response to a character selection operation.

In some embodiments, after step 230, the method may further include: Step 240: Indicate explicitly or implicitly recommendation priorities of selecting candidate accounts after the first recommended virtual character is determined.

In some embodiments, the recommendation priorities are determined according to at least one of the following information: operation proficiencies of the candidate accounts for the first recommended virtual character, quantities of use times of the candidate accounts for the first recommended virtual character, winning percentages of the candidate accounts for the first recommended virtual character, or preferences of the candidate accounts for the first recommended virtual character.

After the first account chooses the first recommended virtual character, priorities of the candidate accounts corresponding to the first recommended virtual character are displayed in the first terminal device. The candidate accounts are accounts that can be recommended after the first account chooses the first recommended virtual character. The candidate accounts are accounts that have not locked a virtual character. After an account has locked a virtual character, the account is no longer a candidate account. The priorities may be displayed explicitly. “Explicitly” refers to that the priorities are displayed directly. For example, the priorities may be displayed by displaying priority characters “High” and “Low” around the candidate accounts, or the priorities may be displayed by displaying priority data “1” and “2” around the candidate accounts, or the priorities may be displayed by using prompt boxes with different brightness for the candidate accounts. This is not limited in this disclosure. In some embodiments, the priorities may be displayed implicitly. “Implicitly” refers to that the priorities are displayed through sorting. For example, the priorities of the accounts may be displayed in descending order or ascending order of priorities.

In some embodiments, the priorities may be displayed according to the operation proficiencies of the candidate accounts for the first recommended virtual character. The operation proficiencies of the first recommended virtual character are determined according to quantities of use times and battle records of the candidate accounts for the first recommended virtual character. When a candidate character uses the first recommended virtual character more often and has a better battle record of using the first recommended virtual character, an operation proficiency of the candidate character is higher, and a priority of the candidate character is higher. In some embodiments, the priorities may be displayed according to quantities of use times and winning percentages of the candidate accounts for the first recommended virtual character. Similarly, when a candidate character uses the first recommended virtual character more often and has a higher winning percentage of using the first recommended virtual character, a priority of the candidate character is higher. In some embodiments, the priorities may be displayed according to preferences of the candidate accounts for the first recommended virtual character. The preferences of the candidate accounts for the first recommended virtual character may be determined through use frequencies of the candidate accounts for the first recommended virtual character, or may be obtained from preferred virtual characters set by the candidate accounts. In some embodiments, the priorities may be determined according to a combination of the plurality of priority indicators described above. This is not limited in this disclosure.

Similarly, after a recommended virtual character is selected, priorities of the candidate accounts are displayed to assist a recommender account in selecting a candidate account appropriate for the recommended virtual character, thereby improving efficiency of recommending a character.

Step 250: Determine a second account from candidate accounts and transmit character recommendation information to a second terminal device in response to an account selection operation, where the character recommendation information is used for recommending the second account to use the first recommended virtual character to participate in the multiplayer interactive service, the second terminal device displays, in response to the character recommendation information, a selection control for selecting the first recommended virtual character in a second character selection interface, and the selection control displays an identifier of the first account and information about the first recommended virtual character.

In some embodiments, the character selection operation and the account selection operation may be single-step operations. For example, in the method B, the step of moving the recommended virtual character to a recommendee account region. In some embodiments, the character selection operation and the account selection operation may be multi-step operations. For example, in both the method A and the method C, a virtual character is selected (through a tap or a long press) first, and then a recommendee account is selected (through a tap or by moving a finger).

Step 260: Display, in the first character selection interface in a case that the second account selects the first recommended virtual character by triggering the selection control, indication information of the first recommended virtual character selected by the second account.

Step 210, step 230, step 250, and step 260 are introduced in the foregoing embodiments, and details are not described herein again.

In some embodiments, the first character selection interface further includes an interface switching control and a character display interface obtained by switching interfaces. A specific implementation is as follows:

A character display interface is displayed in response to selecting a target virtual character in the plurality of candidate virtual characters by the first account to participate in the multiplayer interactive service. The character display interface displays character information of the target virtual character selected by the first account, and the character display interface displays the interface switching control.

The character display interface is switched in response to an operation for the interface switching control to display the first character selection interface.

After the user selects the target virtual character, the character display interface of the target virtual character is displayed. The character display interface displays the character information and the interface switching control of the target virtual character. In some embodiments, the target virtual character may be a virtual character selected by the user, or may be a virtual character recommended by another account. This is not limited in this disclosure.

In response to an operation of the interface switching control by the user, switching is performed between the character display interface and the character selection interface.

Figure 7A:
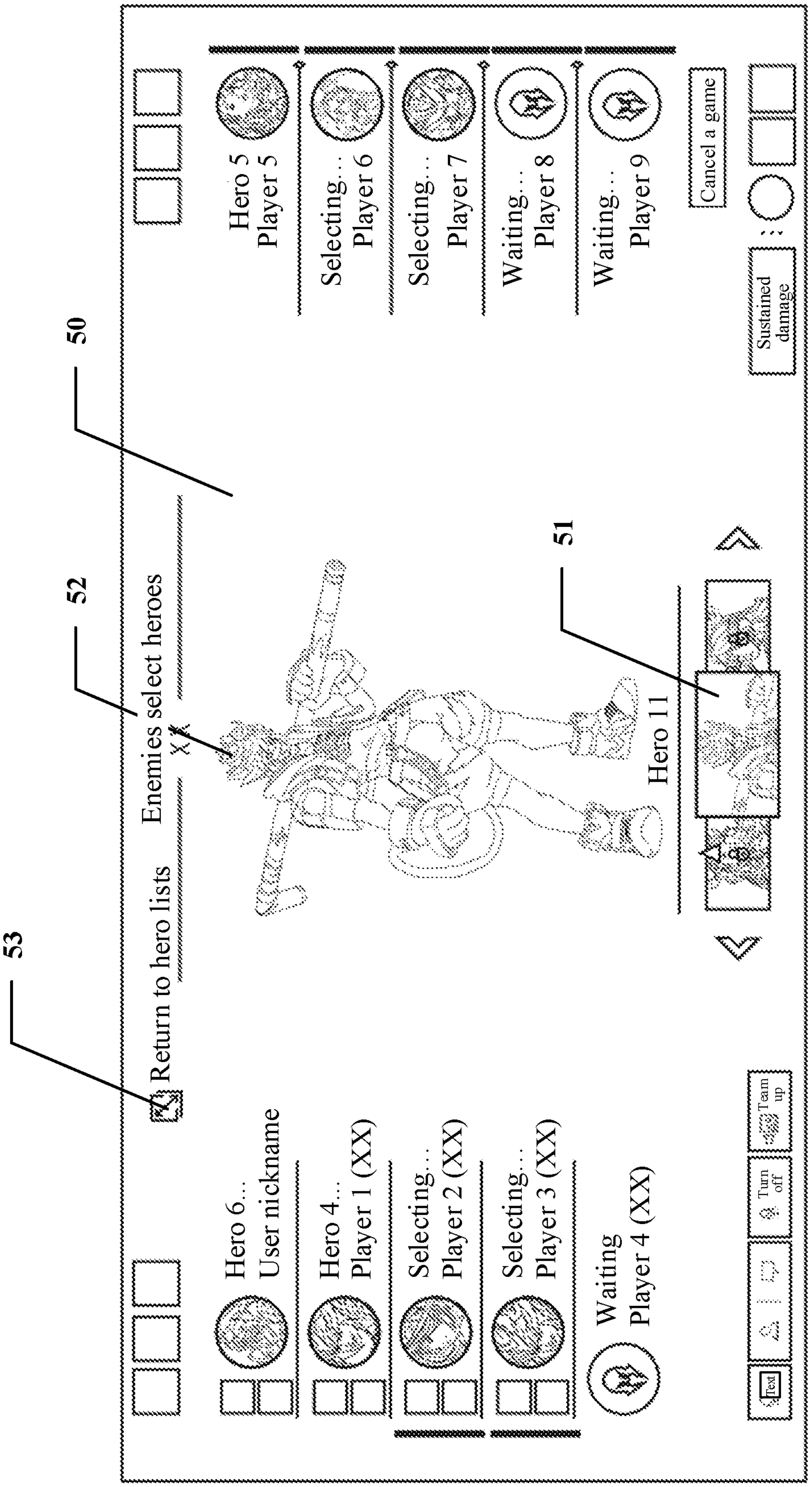
FIG. 7A and FIG. 7B are schematic diagrams of interface switching according to some embodiments of this disclosure.
Figure 7B:
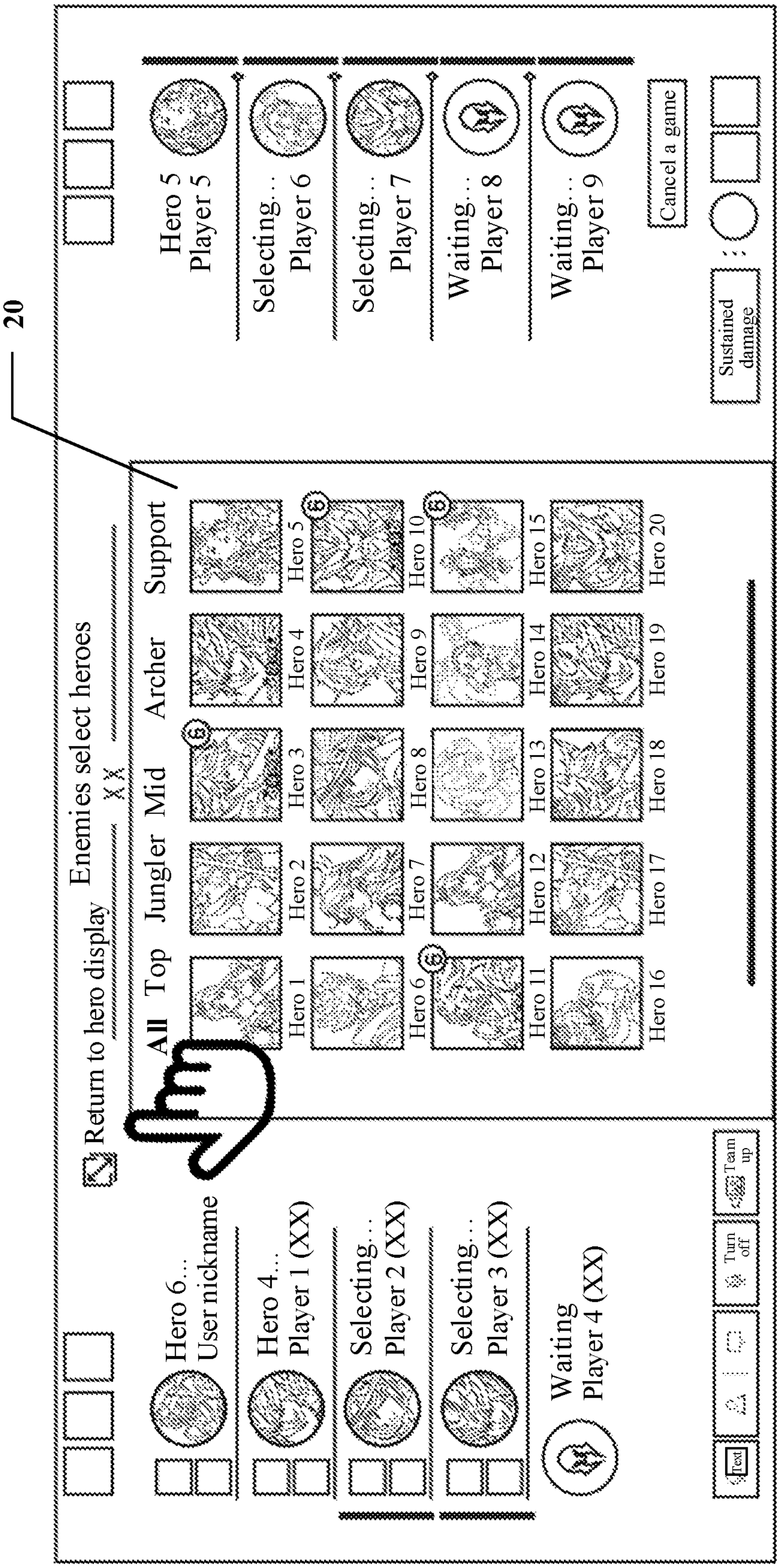

In some embodiments, FIG. 7A and FIG. 7B show an example of a schematic diagram of a character display interface. In FIG. 7A, a character display interface 50 displays a target virtual character 51, information 52 (a full-body standing drawing) about the target virtual character, and an interface switching control 53. As shown in FIG. 7B, a user may switch between the character display interface 50 and a character selection interface 20 by tapping the interface switching control 53.

The foregoing method of implementing the character display interface and a switching interface may be performed after step 210 or after step 250. This is not limited in this disclosure.

In the embodiments of this disclosure, through the interface switching control, after selecting a virtual character, an account may can recommend a virtual character to another account, thereby ensuring that the recommendation of a virtual character can be carried out at any time, and ensuring integrity of the solution.

Figure 8:
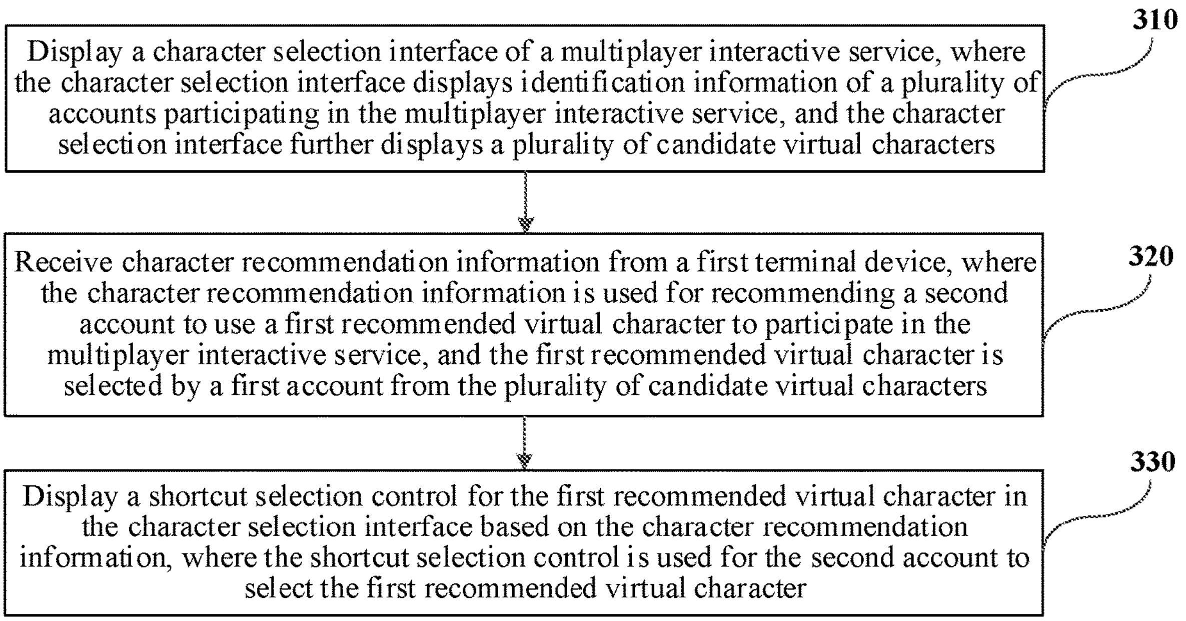
FIG. 8 is a flowchart of a method for processing a virtual character according to some other embodiments of this disclosure.

FIG. 8 is a flowchart of a method for processing a virtual character according to some other embodiments of this disclosure. An execution body of the method may be the terminal device 10 in the implementation environment of the solution shown in FIG. 1. For example, the steps may be performed by the second terminal device, and the second client of the application is installed on the second terminal device. The method may include at least one step in the following steps (310 to 330):

Step 310: Display a character selection interface of a multiplayer interactive service, where the character selection interface displays identification information of a plurality of accounts participating in the multiplayer interactive service, and the character selection interface further displays a plurality of candidate virtual characters. For example, a character selection interface of a multiplayer interactive service id displayed. The character selection interface displays one or more teammate accounts and a plurality of candidate virtual characters. The one or more teammate accounts participate in the multiplayer interactive service through respective virtual characters.

Similarly, the second terminal device also displays the character selection interface, and the character selection interface displays identification information of the plurality of accounts participating in the multiplayer interactive service and information about a plurality of virtual characters to be selected.

Step 320: Receive character recommendation information from a first terminal device, where the character recommendation information is used for recommending a second account to use a first recommended virtual character to participate in the multiplayer interactive service, and the first recommended virtual character is selected by a first account from the plurality of candidate virtual characters. For example, first character recommendation information is received by a second terminal device from a first terminal device. The first character recommendation information recommends that a second account corresponding to the second terminal device use a first recommended virtual character to participate in the multiplayer interactive service. The first recommended virtual character was selected from the plurality of candidate virtual characters by a first account corresponding to the first terminal device.

The second terminal device receives the character recommendation information transmitted by the first terminal device through the server. The foregoing character recommendation information is used for indicating the second account to select the recommended virtual character.

Step 330: Display a shortcut selection control for the first recommended virtual character in the character selection interface based on the character recommendation information, where the shortcut selection control is used for the second account to select the first recommended virtual character. For example, a selection control is displayed for the first recommended virtual character in the character selection interface based on the first character recommendation information. The selection control for the first recommended virtual character enables the second account to select the first recommended virtual character, and the selection control for the first recommended virtual character comprises an identifier of the first account and information about the first recommended virtual character.

The second terminal device displays the shortcut selection control according to the received character recommendation information. The shortcut selection control displays an account ID (the first account) of a recommender and a recommended virtual character (the first recommended virtual character). In some embodiments, according to a plurality of recommended virtual characters recommended by the first account at one time, the account ID (the first account) of the recommender and the recommended virtual characters (the plurality of recommended virtual characters) are displayed in the shortcut selection control displayed in the character selection interface in the second terminal device.

In some embodiments, step 330 includes: displaying a shortcut lock control for the first recommended virtual character in the character selection interface based on the character recommendation information in a case that the second account is in a character selection state, where the shortcut lock control is used for the second account to lock the first recommended virtual character; or displaying a shortcut preselect control for the first recommended virtual character in the character selection interface based on the character recommendation information in a case that the second account is not in a character selection state, where the shortcut preselect control is used for the second account to preselect the first recommended virtual character.

Different shortcut selection controls are displayed according to a virtual character selection state of the second account. In some embodiments, when the second account is in the character selection state, the foregoing shortcut selection control may be a shortcut lock control. For an operation of the shortcut lock control, the second account selects and locks the first recommended virtual character, and cannot change the virtual character again. In some embodiments, when the second account is not in the character selection state, the foregoing shortcut selection control may be a shortcut preselect control. For an operation of the shortcut preselect control, the second account selects and preselects the first recommended virtual character. In this case, the second character can change the selected virtual character at any time.

Figure 9:
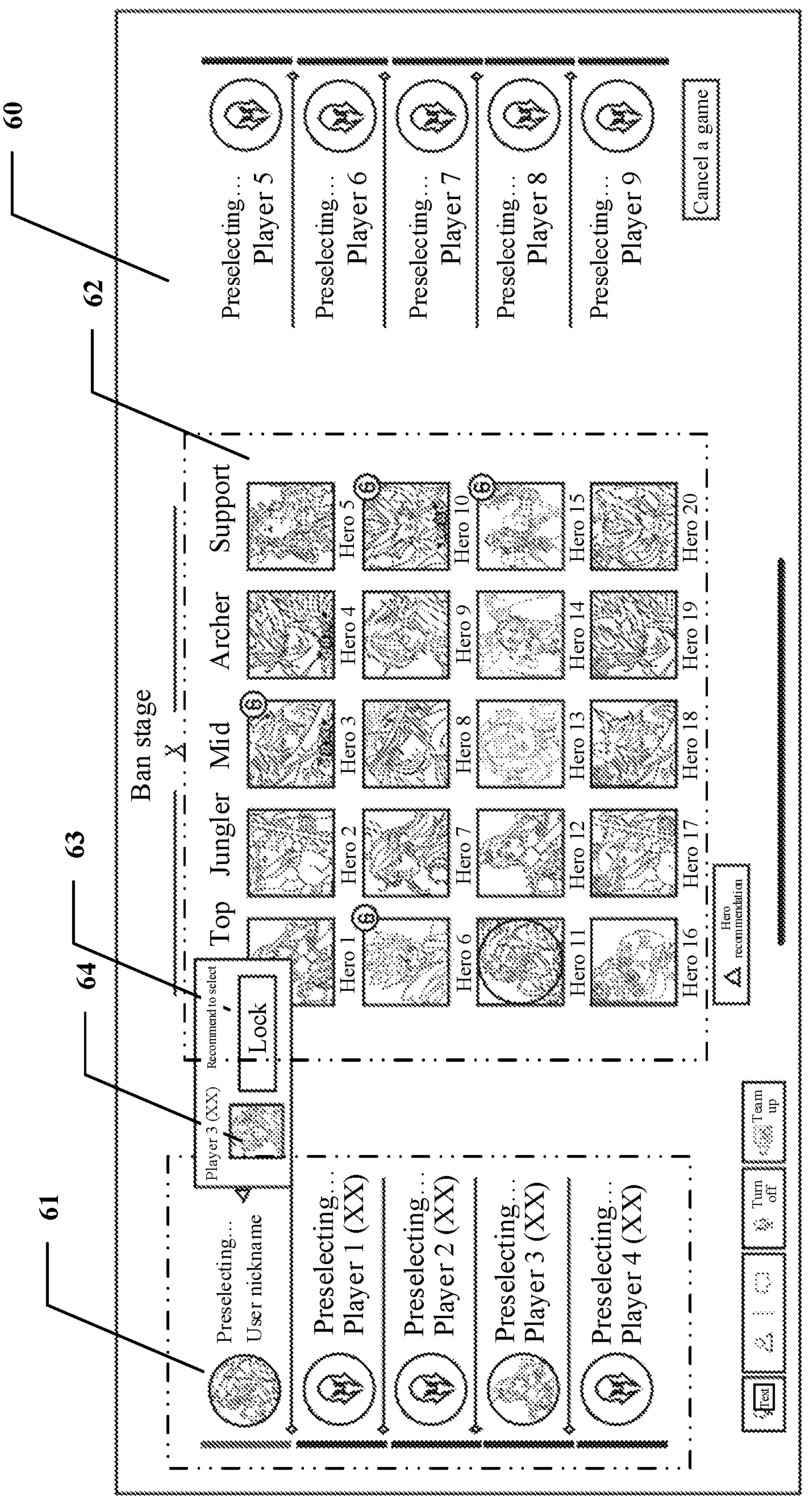
FIG. 9 is a schematic diagram of a shortcut selection control according to some embodiments of this disclosure.

In some embodiments, FIG. 9 shows an example of a schematic diagram of a character selection interface of the second account. As shown in FIG. 9, a character selection interface 60 displays a candidate account region 61, a candidate virtual character region 62, and a shortcut selection control. In FIG. 9, the shortcut selection control is a shortcut lock control 63, a user of the second account selects the first recommended virtual character 64 by locking the shortcut lock control 63. In some embodiments, the user of the second account may select, without operating the shortcut lock control 63, a virtual character that the user wants to use. In some embodiments, the shortcut selection control may be a shortcut preselect control, and the user of the second account preselects the first recommended virtual character through the shortcut preselect control. In some embodiments, the user of the second account may change the selected virtual character after preselecting the first recommended virtual character. In some embodiments, the user of the second account may select, without operating the shortcut lock control 63, a virtual character that the user wants to use. This is not limited in this disclosure.

Different shortcut selection interfaces are displayed in different stages of selecting a virtual character. The diversity of selecting a recommended virtual character is increased, and after a recommended virtual character is preselected, the selected virtual character may be switched, thereby improving flexibility of selecting a character by an account.

In some embodiments, in a case that a first shortcut selection control for the first recommended virtual character is displayed in the character selection interface and recommended character information of a second recommended virtual character is received, a second shortcut selection control for the second recommended virtual character is displayed in place of the displayed first shortcut selection control for the first recommended virtual character in the character selection interface.

When the second account receives the recommended character information transmitted by the plurality of accounts, shortcut selection controls corresponding to the recommended character information transmitted by the plurality of accounts are sequentially displayed in the second terminal device. A shortcut selection control generated first is replaced with a shortcut selection control generated later. Alternatively, in some embodiments, in the second terminal device, a plurality of shortcut selection controls may be generated and displayed sequentially according to a receiving order of the recommended character information, and the user may select a plurality of recommended virtual characters in the plurality of shortcut selection controls.

The shortcut selection controls are covered or displayed at the same time, to provide various selection methods for an account, thereby improving the diversity of the recommended virtual characters.

In some embodiments, in a case that a display time of the shortcut selection control exceeds set duration and is not triggered, the display of the shortcut selection control is canceled.

In a case that the shortcut selection control is not triggered for a long time, the display of the shortcut selection control is canceled. For example, if the user does not operate the shortcut selection control for 5 seconds, the display of the shortcut selection control is canceled. Alternatively, in some embodiments, the shortcut selection control is not canceled over time, and the shortcut selection control is canceled when the user selects the recommended virtual character or closes the shortcut selection control.

A retention time of the shortcut selection control is set, to keep the character selection interface simple when an account does not want to select a recommended virtual character. In addition, operations and a time required for the user to close the shortcut selection control are avoided.

In some embodiments, in a case that there are a plurality of first recommended virtual characters, a display sequence of the plurality of first recommended virtual characters is determined according to at least one of the following information: operation proficiencies of the second account for the first recommended virtual characters, quantities of use times of the second account for the first recommended virtual characters, winning percentages of the second account for the first recommended virtual characters, preferences of the second account for the first recommended virtual characters, or matching degrees between the first recommended virtual characters and a target virtual character selected by the first account.

In the embodiments of this disclosure, a virtual character is recommended to a recommendee, so that the recommendee may directly select a recommended virtual character through a shortcut selection control. Compared with that the recommendee performs a search and selects a virtual character, the efficiency of selecting a virtual character by the recommendee is improved. In addition, the recommendee may directly select the recommended virtual character, thereby reducing learning costs for the recommendee to select a virtual character.

In addition, a plurality of recommended virtual characters are sorted through a plurality of solutions, to facilitate selection of a recommended virtual character by the user, and reduce a time required for the user to select a recommended virtual character, thereby improving the efficiency of human-computer interaction.

In some embodiments, the second terminal device can receive character recommendation information transmitted by the first terminal device, and can transmit character recommendation information to another terminal device (a third terminal device) to recommend a virtual character to another account.

In response to a character recommendation operation for a third account in the plurality of accounts, a third recommended virtual character is determined from the plurality of candidate virtual characters, and another piece of character recommendation information is transmitted to a third terminal device, where the another piece of character recommendation information is used for recommending the third account to use the third recommended virtual character to participate in the multiplayer interactive service. In a case that the third account selects the third recommended virtual character, indication information of the third recommended virtual character selected by the third account is displayed in the character selection interface.

In some embodiments, the second account may recommend a virtual character to the third account, and transmit character recommendation information to a terminal device of the third account through the server. A specific processing method is introduced in the foregoing embodiment in which the first account recommends a virtual character to the second account. Details are not described herein again. Similarly, the third account may recommend a virtual character to another account. This is not limited in this disclosure.

Figure 10:
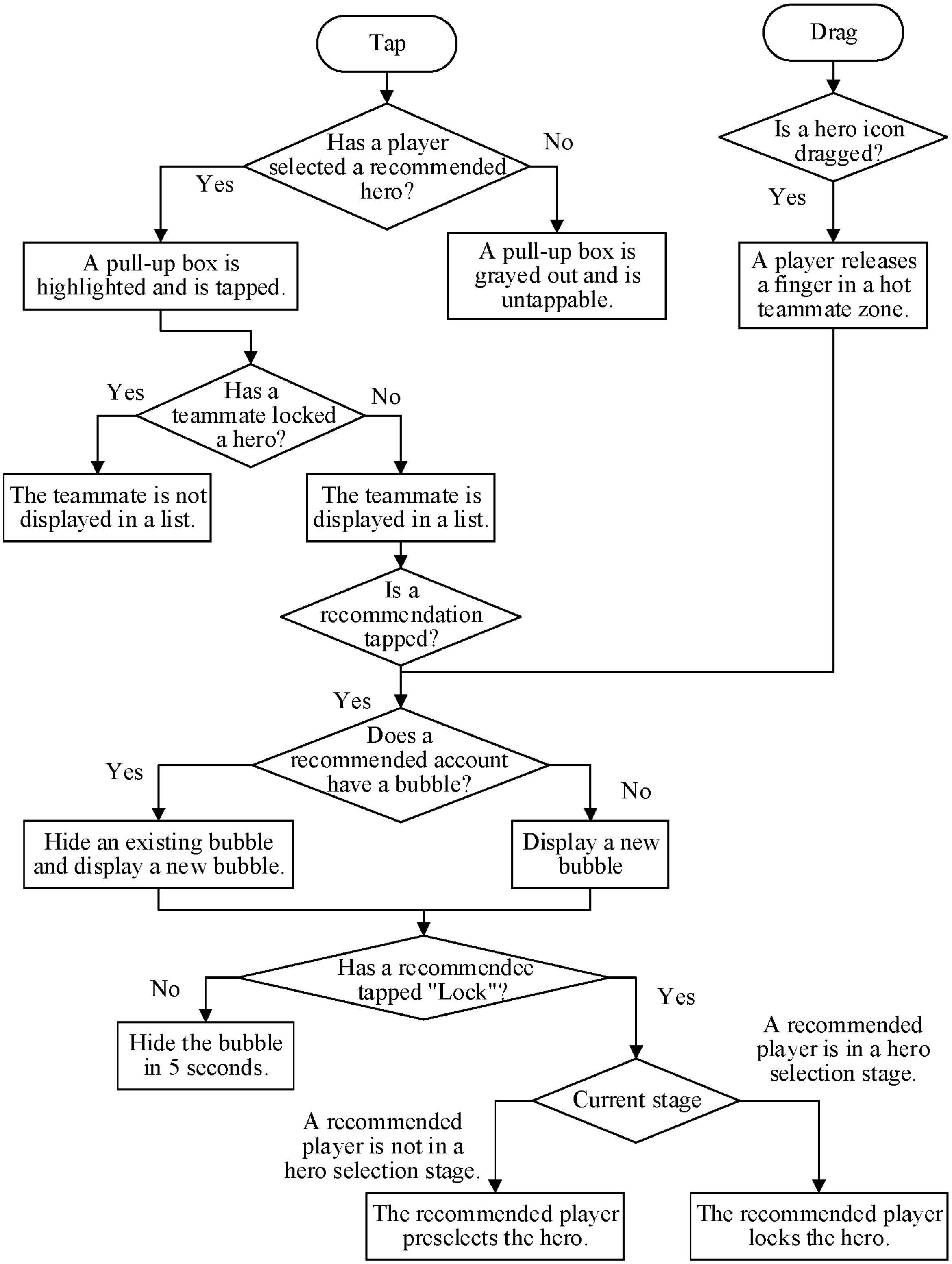
FIG. 10 is a schematic diagram of a method for processing a virtual character according to some embodiments of this disclosure.

In some embodiments, FIG. 10 shows a schematic diagram of a method for processing a virtual character according to some embodiments of this disclosure.

After a user of a target account selects a recommended virtual character, a character recommendation control changes from graying out a pull-up box to highlighting the pull-up box. In this case, the user may open the pull-up box of the character recommendation control and select a recommendee account in the pull-up box. The recommendee account is an account that has not selected a virtual character, and character recommendation information is transmitted to a terminal device corresponding to the recommendee account by tapping a recommendation button. In some embodiments, the character recommendation information may be transmitted by dragging an icon of a virtual character to an icon of an account that has not selected a virtual character. Next, the character recommendation information is received by the recommendee account, and a corresponding shortcut selection control is generated. In this case, if another shortcut selection control is displayed in a terminal device of the recommendee account, the another shortcut selection control is replaced. If not, the shortcut selection control is displayed. The user of the recommendee account may lock and preselect a recommended virtual character by tapping a lock or preselect button. In some embodiments, when the user of the recommendee account does not operate the shortcut selection control, the shortcut selection control is canceled in 5 seconds.

The following is an apparatus embodiment of this disclosure, which can be used to perform the method embodiments of this disclosure. For details not disclosed in the apparatus embodiments of this disclosure, refer to the method embodiments of this disclosure.

Figure 11:
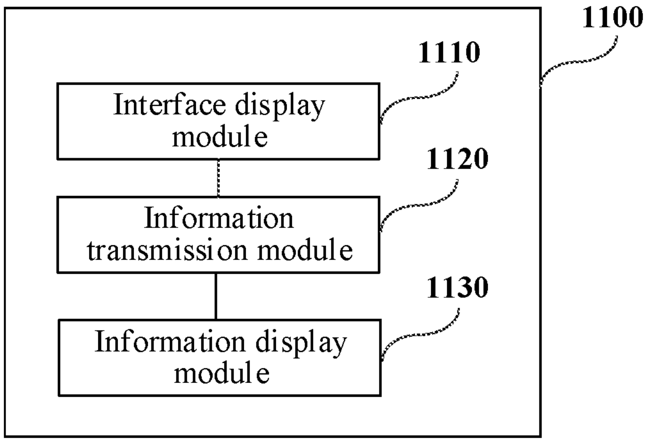
FIG. 11 is a block diagram of an apparatus for processing a virtual character according to some embodiments of this disclosure.

FIG. 11 is a block diagram of an apparatus for processing a virtual character according to some embodiments of this disclosure. The apparatus has a function of implementing the foregoing method for processing a virtual character, and the function may be implemented by hardware, or may be implemented by hardware executing corresponding software. The apparatus may be a terminal device, or may be disposed in a terminal device. The apparatus 1100 may include: an interface display module 1110, an information transmission module 1120, and an information display module 1130.

The interface display module 1110 is configured to display a first character selection interface of a multiplayer interactive service, where the first character selection interface displays identification information of a plurality of accounts and a plurality of candidate virtual characters, and the plurality of accounts participate in the multiplayer interactive service through respective virtual characters.

The information transmission module 1120 is configured to: determine a first recommended virtual character from the plurality of candidate virtual characters, determine a second account from the plurality of accounts, and transmit character recommendation information to a second terminal device corresponding to the second account in response to a character recommendation operation for a first account corresponding to a first terminal device in the first character selection interface, where the character recommendation information is used for recommending the second account to use the first recommended virtual character to participate in the multiplayer interactive service. The second terminal device displays, in response to the character recommendation information, a selection control for selecting the first recommended virtual character in a second character selection interface, and the selection control displays an identifier of the first account and information about the first recommended virtual character.

The information display module 1130 is configured to display, in the first character selection interface in a case that the second account selects the first recommended virtual character by triggering the selection control, indication information of the first recommended virtual character selected by the second account.

In some embodiments, the interface display module 1110 is further configured to: determine, in response to a selection operation for any virtual character in the plurality of candidate virtual characters, the selected virtual character as the first recommended virtual character, and switch an account selection control displayed in the first character selection interface from an un-triggerable state to a triggerable state; and display at least one candidate account in the plurality of accounts in response to a trigger operation on the account selection control.

The information transmission module 1120 is configured to determine, in response to a selection operation for any account in the at least one candidate account, the selected account as the second account, to transmit the character recommendation information to the second terminal device.

In some embodiments, the at least one candidate account is an account that satisfies a first condition and is selected from the plurality of accounts, where the first condition includes at least one of the following: an account has not selected a virtual character, or recommendation to use a virtual character is allowed for an account.

In some embodiments, the information transmission module 1120 configured to determine, in response to a gesture swipe operation from a display region of the first recommended virtual character to a display region of the second account, a virtual character corresponding to a start position of the gesture swipe operation as the first recommended virtual character, and determine an account corresponding to an end position of the gesture swipe operation as the second account, to transmit the character recommendation information to the second terminal device.

In some embodiments, the interface display module 1110 is further configured to: display a selectable account and an unselectable account in the plurality of accounts differently in the first character selection interface during execution of the gesture swipe operation; and display the second account and another account in the plurality of accounts differently in response to the end position of the gesture swipe operation being located within a display region of the second account.

In some embodiments, the interface display module 1110 is further configured to: determine, in response to a selection operation for any virtual character in the first character selection interface, the selected virtual character as the first recommended virtual character, and display at least one candidate account in the plurality of accounts around an operation position of the selection operation.

The information transmission module 1120 is configured to determine, in response to a swipe operation from the operation position of the selection operation to a display region of any account in at least one candidate account displayed around, an account corresponding to an end position of the swipe operation as the second account, to transmit the character recommendation information to the second terminal device.

Figure 12:
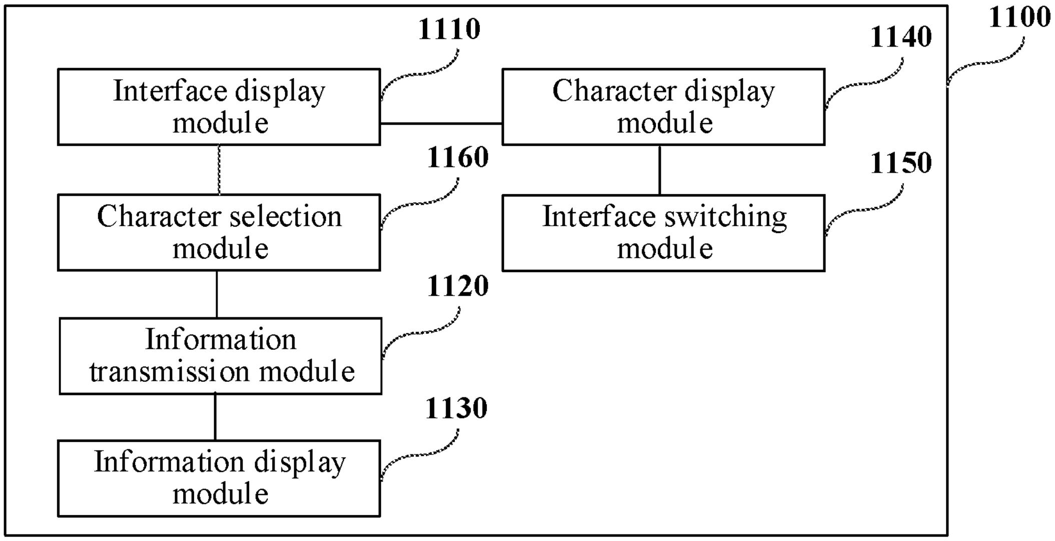
FIG. 12 is a block diagram of an apparatus for processing a virtual character according to some other embodiments of this disclosure.

In some embodiments, as shown in FIG. 12, the apparatus 1100 further includes: a character display module 1140 and an interface switching module 1150.

The character display module 1140 is configured to display a character display interface in response to selecting a target virtual character in the plurality of candidate virtual characters by the first account to participate in the multiplayer interactive service, where the character display interface displays the target virtual character selected by the first account, and the character display interface further displays an interface switching control.

The interface switching module 1150 is configured to switch, in response to an operation for the interface switching control, the character display interface to display the first character selection interface.

In some embodiments, as shown in FIG. 12, the apparatus 1100 further includes a character selection module 1160.

The character selection module 1160 is configured to use at least one virtual character that satisfies a second condition as the candidate virtual character. The second condition including at least one of the following: matching a target virtual character that is selected by the first account and is used for participating in the multiplayer interactive service, matching a character category selected by the second account, and matching a virtual character attribute preselected by the second account.

In some embodiments, the interface display module 1110 is further configured to indicate explicitly or implicitly priorities of selecting candidate accounts after the first recommended virtual character is determined.

In some embodiments, the priorities are determined according to at least one of the following information: operation proficiencies of the candidate accounts for the first recommended virtual character, quantities of use times of the candidate accounts for the first recommended virtual character, winning percentages of the candidate accounts for the first recommended virtual character, or preferences of the candidate accounts for the first recommended virtual character.

In the embodiments of this disclosure, a recommender selects a recommended virtual character in a character selection interface and transmits character recommendation information with a terminal device to provide the recommended virtual character to a recommendee. After receiving the character recommendation information, a terminal device of the recommendee displays a shortcut selection control for the recommended virtual character in the character selection interface, so that the recommendee quickly selects the virtual character. The recommender selects the recommended virtual character in the character selection interface to recommend the virtual character to the recommendee. Compared with systems in which a character can only be recommended through typing or voice in related technologies, the method for processing a virtual character in this disclosure is more efficient, reduces the time for the recommender to provide character recommendation information.

Figure 13:
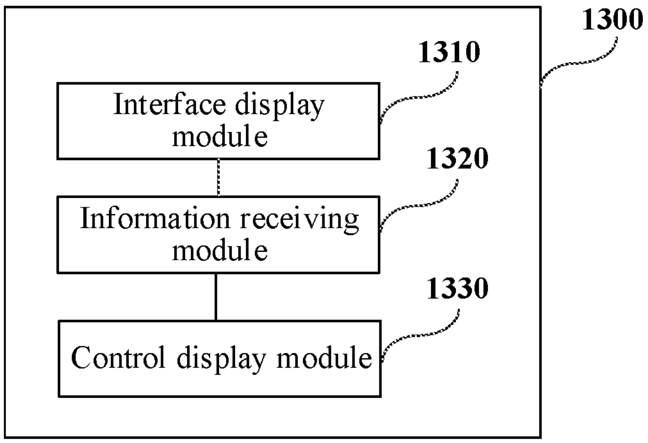
FIG. 13 is a block diagram of an apparatus for processing a virtual character according to some other embodiments of this disclosure.

FIG. 13 is a block diagram of an apparatus for processing a virtual character according to some other embodiments of this disclosure. The apparatus has a function of implementing the foregoing method for processing a virtual character, and the function may be implemented by hardware, or may be implemented by hardware executing corresponding software. The apparatus may be a terminal device, or may be disposed in a terminal device. The apparatus 1300 may include: an interface display module 1310, an information receiving module 1320, and a control display module 1330.

The interface display module 1310 is configured to display a character selection interface of a multiplayer interactive service, where the character selection interface displays identification information of a plurality of accounts and a plurality of candidate virtual characters. The plurality of accounts participating in the multiplayer interactive service through respective virtual characters.

The information receiving module 1320 is configured to receive first character recommendation information from a first terminal device, where the first character recommendation information is used for recommending a second account corresponding to the second terminal device to use a first recommended virtual character to participate in the multiplayer interactive service, and the first recommended virtual character is selected from the plurality of candidate virtual characters by a first account corresponding to the first terminal device.

The control display module 1330 is configured to display a selection control for the first recommended virtual character in the character selection interface based on the first character recommendation information, where the selection control for the first recommended virtual character is used for the second account to select the first recommended virtual character, and the selection control for the first recommended virtual character includes an identifier of the first account and information about the first recommended virtual character.

In some embodiments, the selection control includes: a lock control or a preselect control; and the control display module 1330 is configured to display a lock control for the first recommended virtual character in the character selection interface based on the first character recommendation information in a case that the second account is in a character selection state, where the lock control is used for the second account to lock the first recommended virtual character; or display a preselect control for the first recommended virtual character in the character selection interface based on the first character recommendation information in a case that the second account is not in a character selection state, where the preselect control is used for the second account to preselect the first recommended virtual character.

In some embodiments, the information receiving module 1320 is further configured to receive second character recommendation information from a third terminal device, where the second character recommendation information is used for recommending the second account to use a second recommended virtual character to participate in the multiplayer interactive service, and the second recommended virtual character is selected from the plurality of candidate virtual characters by a third account corresponding to the third terminal device; and the control display module 1330 is further configured to: display a selection control for the second recommended virtual character in place of the selection control for the first recommended virtual character displayed in the character selection interface, where the selection control for the second recommended virtual character is used for the second account to select the second recommended virtual character, and the selection control for the second recommended virtual character includes an identifier of the third account and information about the second recommended virtual character.

In some embodiments, the information receiving module 1320 is further configured to: receive third character recommendation information from a fourth terminal device, where the third character recommendation information is used for recommending the second account to use a third recommended virtual character to participate in the multiplayer interactive service, and the third recommended virtual character is selected from the plurality of candidate virtual characters by a fourth account corresponding to the fourth terminal device; and the control display module 1330 is further configured to: sequentially display the selection control for the first recommended virtual character and a selection control for the third recommended virtual character according to a receiving time order of the first character recommendation information and the third character recommendation information, where the selection control for the third recommended virtual character is used for the second account to select the third recommended virtual character, and the selection control for the third recommended virtual character includes an identifier of the fourth account and information about the third recommended virtual character.

Figure 14:
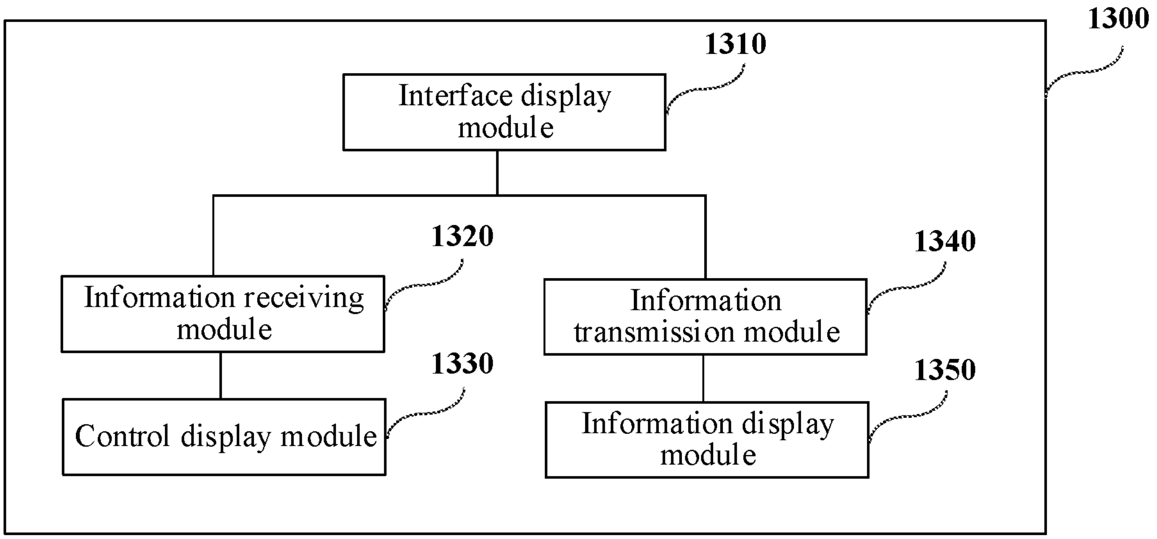
FIG. 14 is a block diagram of an apparatus for processing a virtual character according to some other embodiments of this disclosure.

In some embodiments, as shown in FIG. 14, the apparatus 1300 further includes: an information transmission module 1340 and an information display module 1350.

The information transmission module 1340 is configured to: determine a fourth recommended virtual character from the plurality of candidate virtual characters in response to a character recommendation operation for a fifth account in the plurality of accounts, and transmit another piece of character recommendation information to a fifth terminal device corresponding to the fifth account, where the another piece of character recommendation information is used for recommending the fifth account to use the fourth recommended virtual character to participate in the multiplayer interactive service.

The information display module 1350 is configured to display indication information of the fourth recommended virtual character selected by the fifth account in the character selection interface in a case that the fifth account selects the fourth recommended virtual character.

In some embodiments, in a case that there are a plurality of first recommended virtual characters, a display sequence of the plurality of first recommended virtual characters is determined according to at least one of the following information: operation proficiencies of the second account for the first recommended virtual characters, quantities of use times of the second account for the first recommended virtual characters, winning percentages of the second account for the first recommended virtual characters, preferences of the second account for the first recommended virtual characters, or matching degrees between the first recommended virtual characters and a target virtual character selected by the first account.

In the embodiments of this disclosure, a virtual character is recommended to a recommendee, so that the recommendee may directly select a recommended virtual character through a shortcut selection control. Compared with that the recommendee performs a search and selects a virtual character, the efficiency of selecting a virtual character by the recommendee is improved. In addition, the recommendee may directly select the recommended virtual character, thereby reducing learning costs for the recommendee to select a virtual character.

Figure 15:
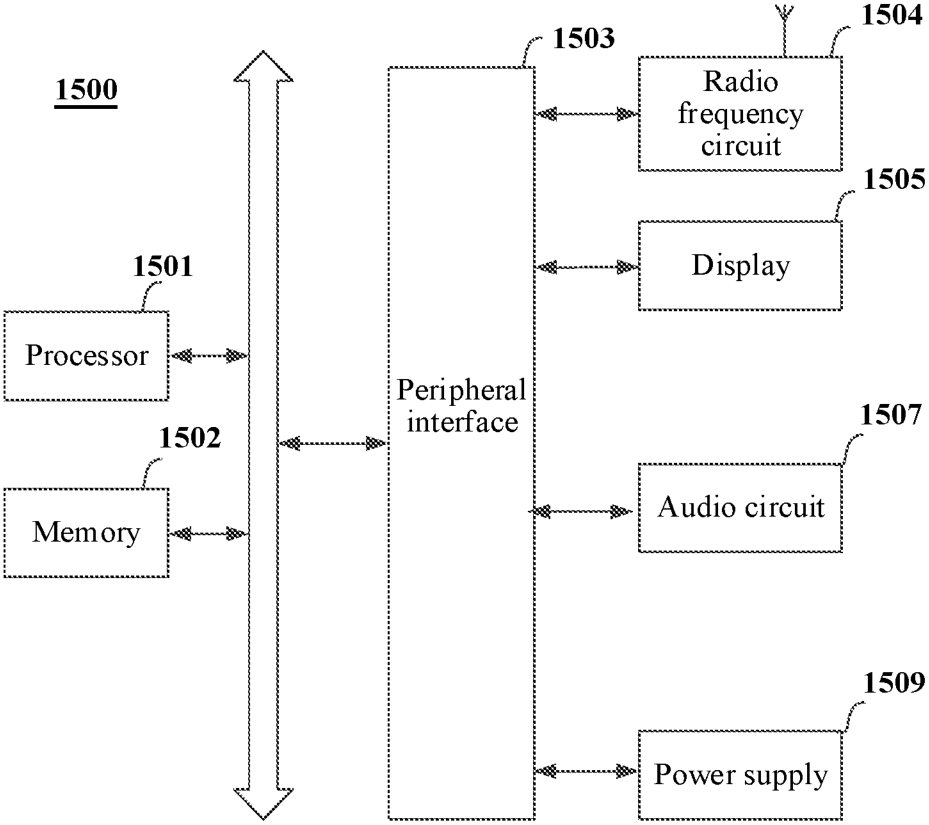
FIG. 15 is a structural block diagram of a terminal device according to some embodiments of this disclosure.

FIG. 15 is a structural block diagram of a terminal device 1500 according to some embodiments of this disclosure. The terminal device 1500 may be an electronic device such as a mobile phone, a tablet computer, a game console, an ebook reader, a multimedia playback device, a wearable device, or a PC. The terminal device is configured to perform the method for processing a virtual character provided in the foregoing embodiments. The terminal device may be the terminal device 10 in a game running environment shown in FIG. 1. Specifically, Generally, the terminal device 1500 includes: a processor 1501 (processing circuitry) and a memory 1502 (a non-transitory computer-readable storage medium).

The processor 1501 may include one or more processing cores, such as a 4-core processor or an 8-core processor. The processor 1501 may be implemented by using at least one hardware form of a digital signal processing (DSP), a field programmable gate array (FPGA), and a programmable logic array (PLA). The processor 1501 may further include a main processor and a coprocessor. The main processor is a processor configured to process data in an active state, and is also referred to as a central processing unit (CPU). The coprocessor is a low-power consumption processor configured to process data in a standby state. In some embodiments, the processor 1501 may be integrated with a graphics processing unit (GPU). The GPU is configured to be responsible for rendering and drawing content that needs to be displayed in a display. In some embodiments, the processor 1501 may further include an artificial intelligence (AI) processor. The AI processor is configured to process a computing operation related to machine learning.

The memory 1502 may include one or more non-transitory computer-readable storage media. The computer-readable storage media may be non-transitory. The memory 1502 may further include a high-speed random access memory (RAM), and a non-volatile memory, for example, one or more disk storage devices and flash storage devices. In some embodiments, a non-transient computer-readable storage medium in the memory 1502 is configured to store at least one instruction, at least one program, a code set, or an instruction set. The at least one instruction, the at least one program, the code set, or the instruction set is configured to be executed by one or more processors to implement the foregoing method for processing a virtual character.

In some embodiments, the terminal device 1500 may include: a peripheral interface 1503 and at least one peripheral. The processor 1501, the memory 1502, and the peripheral interface 1503 may be connected by a bus or a signal cable. Each peripheral may be connected to the peripheral interface 1503 by a bus, a signal cable, or a circuit board. Specifically, the peripheral includes: at least one of a radio frequency circuit 1504, a display 1505, an audio circuit 1507, and a power supply 1509.

A person skilled in the art may understand that the structure shown in FIG. 15 constitutes no limitation to the terminal device 1500, and the terminal device may include more or fewer components than those shown in the figure, or some components may be combined, or a different component arrangement may be used.

In an exemplary embodiment, a computer-readable storage medium is further provided. The computer-readable storage medium stores at least one instruction, at least one program, a code set, or an instruction set. The at least one instruction, the at least one program, the code set, or the instruction set implements, when being executed by a processor, the foregoing method for processing a virtual character.

In an embodiment, a non-transitory computer-readable storage medium stores computer-readable instructions which, when executed by a computer device, cause the computer device to perform a method for processing a virtual character. The method includes displaying a first character selection interface of a first account of a multiplayer interactive service, the first character selection interface displaying one or more teammate accounts and a plurality of candidate virtual characters. The one or more teammate accounts participates in the multiplayer interactive service through respective virtual characters. The method further includes, in response to receiving in the first character selection interface a character recommendation operation including a selection of a first recommended virtual character from the plurality of candidate virtual characters and a selection of a second account from the one or more teammate accounts, transmitting character recommendation information to a second terminal device corresponding to the second account. The character recommendation information recommends to the second account to use the first recommended virtual character to participate in the multiplayer interactive service. In response to receiving the character recommendation information, the second terminal device displays a selection control for selecting the first recommended virtual character in a second character selection interface. The selection control indicates that the first account has recommended the first recommended virtual character. The method further includes, in response to a determination that the second account has selected the first recommended virtual character by triggering the selection control, displaying, in the first character selection interface of the first account, an indication that the first recommended virtual character was selected by the second account.

In an embodiment, a non-transitory computer-readable storage medium stores computer-readable instructions which, when executed by a computer device, cause the computer device to perform a method for processing a virtual character. The method includes displaying a character selection interface of a multiplayer interactive service, the character selection interface displaying one or more teammate accounts and a plurality of candidate virtual characters. The one or more teammate accounts participate in the multiplayer interactive service through respective virtual characters. The method further includes receiving, by a second terminal device, first character recommendation information from a first terminal device, the first character recommendation information recommending that a second account corresponding to the second terminal device use a first recommended virtual character to participate in the multiplayer interactive service. The first recommended virtual character was selected from the plurality of candidate virtual characters by a first account corresponding to the first terminal device. The method further includes displaying a selection control for the first recommended virtual character in the character selection interface based on the first character recommendation information. The selection control for the first recommended virtual character enables the second account to select the first recommended virtual character, and the selection control for the first recommended virtual character comprises an identifier of the first account and information about the first recommended virtual character.

In some embodiments, the computer-readable storage medium may include: a read-only memory (ROM), a RAM, a solid state drive (SSD), an optical disc, or the like. The RAM may include a resistance RAM (ReRAM) and a dynamic RAM (DRAM).

In an exemplary embodiment, a computer program product is further provided. The computer program product includes computer instructions. The computer instructions are stored in a computer-readable storage medium. A processor reads the computer instructions from the computer-readable storage medium, and executing the computer instructions, to implement the foregoing method for processing a virtual character.

It is to be understood that "plurality of" mentioned in the specification refers to two or more. "And/or" describes an association relationship between associated objects and represents that three relationships may exist. For example, A and/or B may represent the following three cases: Only A exists, both A and B exist, and only B exists. The character "I" generally represents an "or" relationship between the associated objects. In addition, the step numbers described in this specification merely schematically show a possible execution sequence of the steps. In some other embodiments, the steps may not be performed according to the number sequence. For example, two steps with different numbers may be performed simultaneously, or two steps with different numbers may be performed according to a sequence contrary to the sequence shown in the figure. This is not limited in the embodiments of this disclosure.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

The use of "at least one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof.

The foregoing disclosure includes some exemplary embodiments of this disclosure which are not intended to limit the scope of this disclosure. Other embodiments shall also fall within the scope of this disclosure.

What is claimed is:

1. A method for processing a virtual character, the method comprising:

displaying a first character selection interface of a first account of a multiplayer interactive service, the first character selection interface displaying one or more player accounts and a plurality of candidate virtual characters, the one or more player accounts being teammate accounts of the first account on a team formed for the multiplayer interactive service, the one or more player accounts participating in the multiplayer interactive service through respective virtual characters;

determining a portion of the one or more player accounts that satisfy a first condition;

receiving, in the first character selection interface, a user operation for providing a virtual character recommendation, the user operation including (i) a selection of a first recommended virtual character from the plurality of candidate virtual characters and (ii) a selection of a second account from the portion of the one or more player accounts as a recipient of the virtual character recommendation;

when the user operation indicates the first recommended virtual character and the selected second account, transmitting, by processing circuitry of a first terminal device, character recommendation information to a second terminal device corresponding to the selected second account, the character recommendation information indicating the virtual character recommendation for the selected second account, the character recommendation information being configured to cause the second terminal device to display, in a second character selection interface of the selected second account, a selection control element for selecting the first recommended virtual character, the selection control element including an identifier of the first account and indicating the first recommended virtual character, and to cancel display of the selection control element when the displayed selection control element is not triggered for a set duration;

receiving selection confirmation information indicating that the selected second account selected the first recommended virtual character; and displaying, in the first character selection interface of the first account, an indication that the first recommended virtual character was selected by the selected second account based on the selection confirmation information.

2. The method according to claim 1, wherein the virtual character recommendation for the selected second account is a recommendation from the first account for the selected second account to use the first recommended virtual character to participate in the multiplayer interactive service.

3. The method according to claim 1, wherein the virtual character recommendation for the selected second account is a recommendation from the first account for the selected second account not to use the first recommended virtual character to participate in the multiplayer interactive service.

4. The method according to claim 1, wherein the receiving the user operation comprises:

in response to a gesture swipe operation from a display region of a virtual character of the plurality of candidate virtual characters to a display region of a player account in the portion of the one or more player accounts, determining the virtual character corresponding to a start position of the gesture swipe operation as the first recommended virtual character, and determining the player account corresponding to an end position of the gesture swipe operation as the selected second account.

5. The method according to claim 4, wherein the receiving the user operation further comprises, prior to the gesture swipe operation, receiving a tap or long press operation on the virtual character and determining the virtual character as the first recommended virtual character.

6. The method according to claim 4, wherein the receiving the user operation comprises:

in response to a selection operation selecting the virtual character in the first character selection interface, determining the virtual character selected by the selection operation as the first recommended virtual character, and displaying one or more accounts in the portion of the one or more player accounts at a position corresponding to the selection operation; and in response to the gesture swipe operation from a display region of the first recommended virtual character to a display region of one of the one or more accounts displayed at the position corresponding to the selection operation, determining the account corresponding to the end position of the gesture swipe operation as the selected second account.

7. The method according to claim 1, wherein the plurality of candidate virtual characters displayed in the first character selection interface of the first account satisfy a second condition; and the second condition comprises at least one of: (i) the plurality of candidate virtual characters is associated with a target virtual character that is selected by the first account for participating in the multiplayer interactive service, (ii) each of the plurality of candidate virtual characters matches a character category selected by the selected second account, or (iii) each of the plurality of candidate virtual characters corresponds to a virtual character attribute selected by the selected second account, or (iv) the plurality of candidate virtual characters includes a virtual character previously used by the selected second account.

8. The method according to claim 1, further comprising: indicating recommendation priorities of the portion of the one or more player accounts after the first recommended virtual character is selected by the first account, wherein the recommendation priorities are based on a matching degree between the selected first recommended virtual character and each of the player accounts in the portion.

9. The method according to claim 1, further comprising: receiving at least one second character recommendation information from one or more third accounts, the at least one second character recommendation information indicating one or more second recommended virtual characters for the first account;

in response to receiving the at least one second character recommendation information, displaying a selection control of the first account for selecting a target virtual character from among the one or more second recommended virtual characters, wherein the selection control displays an identifier of a third account among the one or more third accounts that transmitted second character recommendation information indicating the target virtual character; and receiving, through the selection control of the first account, an accept operation or a decline operation with respect to selecting the target virtual character.

10. The method according to claim 9, wherein the one or more second recommended virtual characters include plural second recommended virtual characters received from the one or more third accounts, and the plural second recommended virtual characters are displayed in the selection control of the first account one by one sequentially over a time period.

11. The method according to claim 9, wherein the one or more second recommended virtual characters include plural second recommended virtual characters received from the one or more third accounts, and the plural second recommended virtual characters are displayed in the selection control of the first account in a list format.

12. The method according to claim 9, wherein the one or more second recommended virtual characters include plural second recommended virtual characters received from the one or more third accounts, and the plural second recommended virtual characters are displayed in the selection control of the first account in an order based on at least one of (i) respective time of receipt of each of the plural second recommended virtual characters, or (ii) a matching degree between each of the plural second recommended virtual characters and the first account.

13. A first terminal device for processing a virtual character, comprising:

processing circuitry configured to display a first character selection interface of a first account of a multiplayer interactive service, the first character selection interface displaying one or more player accounts and a plurality of candidate virtual characters, the one or more player accounts being teammate accounts of the first account on a team formed for the multiplayer interactive service, the one or more player accounts participating in the multiplayer interactive service through respective virtual characters;

determine a portion of the one or more player accounts that satisfy a first condition;

receive, in the first character selection interface, a user operation for providing a virtual character recommendation, the user operation including (i) a selection of a first recommended virtual character from the plurality of candidate virtual characters and (ii) a selection of a second account from the portion of the one or more player accounts as a recipient of the virtual character recommendation;

when the user operation indicates the first recommended virtual character and the selected second account, transmit character recommendation information to a second terminal device corresponding to the selected second account, the character recommendation information indicating the virtual character recommendation for the selected second account, the character recommendation information being configured to cause the second terminal device to display, in a second character selection interface of the selected second account, a selection control element for selecting the first recommended virtual character, the selection control element including an identifier of the first account and indicating the first recommended virtual character, and to cancel display of the selection control element when the displayed selection control element is not triggered for a set duration;

receive selection confirmation information indicating that the selected second account selected the first recommended virtual character; and display, in the first character selection interface of the first account, an indication that the first recommended virtual character was selected by the selected second account based on the selection confirmation information.

14. The first terminal device according to claim 13, wherein the virtual character recommendation for the selected second account is a recommendation from the first account for the selected second account to use the first recommended virtual character to participate in the multiplayer interactive service.

15. The first terminal device according to claim 13, wherein the virtual character recommendation for the selected second account is a recommendation from the first account for the selected second account not to use the first recommended virtual character to participate in the multiplayer interactive service.

16. The first terminal device according to claim 13, wherein the processing circuitry is further configured to:

in response to a gesture swipe operation from a display region of a virtual character of the plurality of candidate virtual characters to a display region of a player account in the portion of the one or more player accounts, determine the virtual character corresponding to a start position of the gesture swipe operation as the first recommended virtual character, and determine the player account corresponding to an end position of the gesture swipe operation as the selected second account.

17. The first terminal device according to claim 16, wherein the processing circuitry is further configured to:

in response to a selection operation selecting the virtual character in the first character selection interface, determine the virtual character selected by the selection operation as the first recommended virtual character, and display one or more accounts in the portion of the one or more player accounts at a position corresponding to the selection operation; and in response to the gesture swipe operation from a display region of the first recommended virtual character to a display region of one of the one or more accounts displayed at the position corresponding to the selection operation, determine the account corresponding to the end position of the gesture swipe operation as the selected second account.

18. The first terminal device according to claim 13, wherein the processing circuitry is further configured to:

receive at least one second character recommendation information from one or more third accounts, the at least one second character recommendation information indicating one or more second recommended virtual characters for the first account;

in response to receiving the at least one second character recommendation information, display a selection control of the first account for selecting a target virtual character from among the one or more second recommended virtual characters, wherein the selection control displays an identifier of a third account among the one or more third accounts that transmitted second character recommendation information indicating the target virtual character; and receive, through the selection control of the first account, an accept operation or a decline operation with respect to selecting the target virtual character.

19. A non-transitory computer-readable storage medium storing computer-readable instructions thereon, which, when executed by processing circuitry of a first terminal device, cause the terminal device to perform a method comprising:

displaying a first character selection interface of a first account of a multiplayer interactive service, the first character selection interface displaying one or more player accounts and a plurality of candidate virtual characters, the one or more player accounts being teammate accounts of the first account on a team formed for the multiplayer interactive service, the one or more player accounts participating in the multiplayer interactive service through respective virtual characters;

determining a portion of the one or more player accounts that satisfy a first condition;

receiving, in the first character selection interface, a user operation for providing a virtual character recommendation, the user operation including (i) a selection of a first recommended virtual character from the plurality of candidate virtual characters and (ii) a selection of a second account from the portion of the one or more player accounts as a recipient of the virtual character recommendation;

when the user operation indicates the first recommended virtual character and the selected second account, transmitting character recommendation information to a second terminal device corresponding to the selected second account, the character recommendation information indicating the virtual character recommendation for the selected second account, the character recommendation information being configured to cause the second terminal device to display, in a second character selection interface of the selected second account, a selection control element for selecting the first recommended virtual character, the selection control element including an identifier of the first account and indicating the first recommended virtual character, and to cancel display of the selection control element when the displayed selection control element is not triggered for a set duration;

receiving selection confirmation information indicating that the selected second account selected the first recommended virtual character; and displaying, in the first character selection interface of the first account, an indication that the first recommended virtual character was selected by the selected second account based on the selection confirmation information.

20. The method according to claim 1, wherein the first condition includes at least one of (i) a player account in the portion of the one or more player accounts has not locked a virtual character, or (ii) recommendation to use a virtual character is allowed for a player account in the portion of the one or more player accounts.

* * * * *